(12) United States Patent
Emma et al.

(10) Patent No.: US 12,050,574 B2
(45) Date of Patent: *Jul. 30, 2024

(54) ARTIFICIAL INTELLIGENCE PLATFORM WITH IMPROVED CONVERSATIONAL ABILITY AND PERSONALITY DEVELOPMENT

(71) Applicants: Maria Emma, New York City, NY (US); Gregory Alexander D'Amico, Knoxville, TN (US)

(72) Inventors: Maria Emma, New York City, NY (US); Gregory Alexander D'Amico, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,130

(22) Filed: Oct. 27, 2023

(65) Prior Publication Data
US 2024/0054118 A1    Feb. 15, 2024

Related U.S. Application Data

(63) Continuation of application No. 18/200,944, filed on May 23, 2023, which is a continuation of application No. 16/193,845, filed on Nov. 16, 2018, now Pat. No. 11,663,182.

(60) Provisional application No. 62/589,316, filed on Nov. 21, 2017.

(51) Int. Cl.
| | | |
|---|---|---|
| G06F 16/22 | (2019.01) | |
| G10L 15/08 | (2006.01) | |
| G10L 15/22 | (2006.01) | |
| G10L 25/63 | (2013.01) | |
| G10L 13/00 | (2006.01) | |
| G10L 15/16 | (2006.01) | |
| G10L 17/18 | (2013.01) | |

(52) U.S. Cl.
CPC .............. *G06F 16/22* (2019.01); *G10L 15/08* (2013.01); *G10L 15/22* (2013.01); *G10L 13/00* (2013.01); *G10L 2015/088* (2013.01); *G10L 15/16* (2013.01); *G10L 17/18* (2013.01); *G10L 25/63* (2013.01)

(58) Field of Classification Search
None
See application file for complete search history.

(56) References Cited

U.S. PATENT DOCUMENTS

| | | |
|---|---|---|
| 6,773,344 B1 | 8/2004 | Gabai et al. |
| 8,150,695 B1 | 4/2012 | Killalea et al. |
| 8,719,200 B2 | 5/2014 | Beilby et al. |
| 8,818,926 B2 | 8/2014 | Wallace |
| 9,213,904 B1 | 12/2015 | Maali et al. |
| 9,318,113 B2 | 4/2016 | Westby et al. |
| 9,418,654 B1 | 8/2016 | Killalea et al. |
| 9,716,674 B2 | 7/2017 | Ciofalo et al. |
| 9,721,004 B2 | 8/2017 | Byron et al. |

(Continued)

*Primary Examiner* — Nicole A K Schmieder
(74) *Attorney, Agent, or Firm* — NEO IP

(57) ABSTRACT

System, methods, and apparatuses for an artificial intelligence (AI) toy with improved conversational dialogue and personality development. The AI toy determines responses to stimuli based on user profiles and personality profiles that are developed through user interaction and external media inputs. Natural Language Processing (NLP) and other semantic interaction processing is paired with the profiles to develop AI personality and conversational ability.

28 Claims, 13 Drawing Sheets

(56) References Cited

U.S. PATENT DOCUMENTS

| | | | |
|---|---|---|---|
| 9,823,811 | B2 | 11/2017 | Brown et al. |
| 9,833,725 | B2 | 12/2017 | Watry |
| 9,847,084 | B2 | 12/2017 | Gustafson et al. |
| 11,663,182 | B2 * | 5/2023 | Emma .................. G10L 15/08 706/55 |
| 2004/0138959 | A1 | 7/2004 | Hlavac et al. |
| 2013/0016823 | A1 | 1/2013 | Odinak et al. |
| 2014/0032471 | A1 | 1/2014 | Reddy et al. |
| 2016/0019016 | A1 | 1/2016 | Kochavi |
| 2016/0078512 | A1 | 3/2016 | Yopp et al. |
| 2016/0196336 | A1 | 7/2016 | Allen et al. |
| 2017/0132199 | A1 | 5/2017 | Vescovi et al. |
| 2017/0188070 | A1 | 6/2017 | Abed |
| 2017/0250930 | A1 | 8/2017 | Ben-Itzhak |
| 2017/0274289 | A1 | 9/2017 | Judkins et al. |
| 2017/0300472 | A1 | 10/2017 | Parikh et al. |
| 2017/0300648 | A1 | 10/2017 | Charlap |
| 2017/0323010 | A1 | 11/2017 | Byron et al. |
| 2017/0324683 | A1 | 11/2017 | Ciofalo et al. |
| 2018/0018373 | A1 | 1/2018 | Yazdian et al. |
| 2018/0032884 | A1 | 2/2018 | Murugeshan et al. |
| 2018/0061421 | A1 | 3/2018 | Sarikaya |
| 2018/0089164 | A1 | 3/2018 | Iida et al. |
| 2018/0108343 | A1 | 4/2018 | Stevans et al. |
| 2018/0117479 | A1 | 5/2018 | Coolidge et al. |
| 2018/0122266 | A1 | 5/2018 | Azartash et al. |
| 2018/0158458 | A1 | 6/2018 | Weber |
| 2018/0232902 | A1 | 8/2018 | Albadawi et al. |
| 2018/0293483 | A1 | 10/2018 | Abramson et al. |
| 2019/0156222 | A1 | 5/2019 | Emma et al. |
| 2020/0388178 | A1 * | 12/2020 | Barbuto .............. A63F 13/533 |

\* cited by examiner

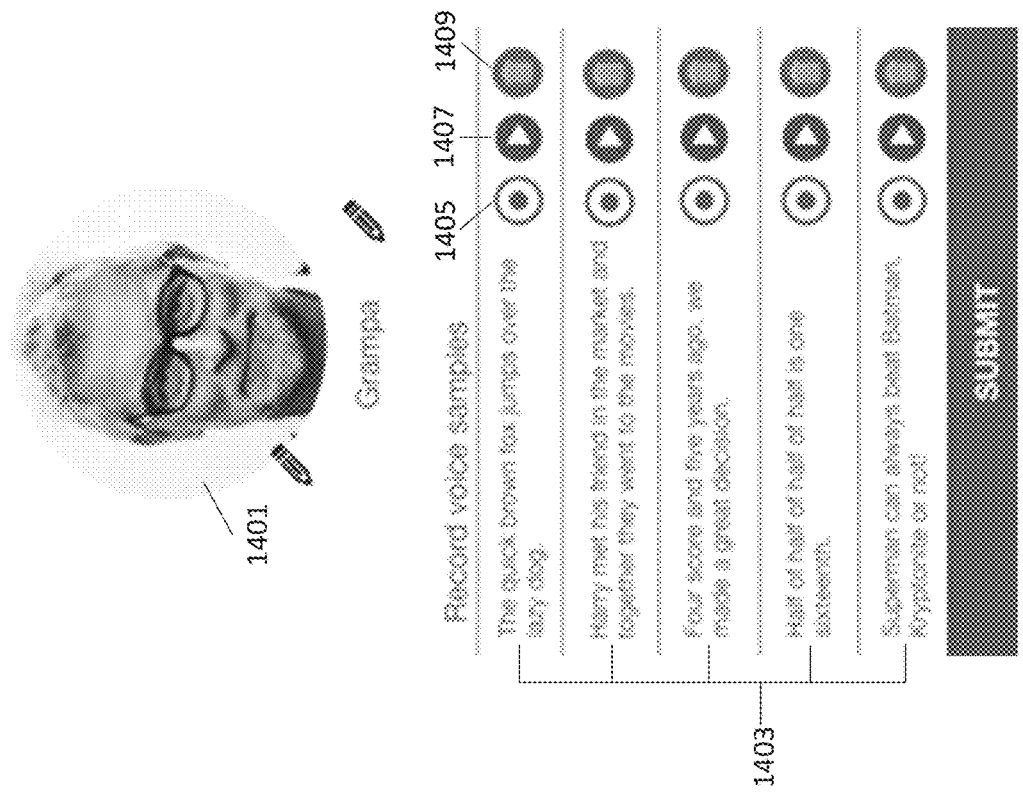
FIG. 14
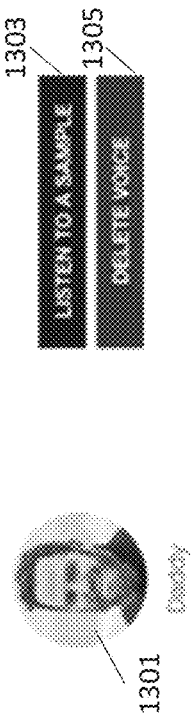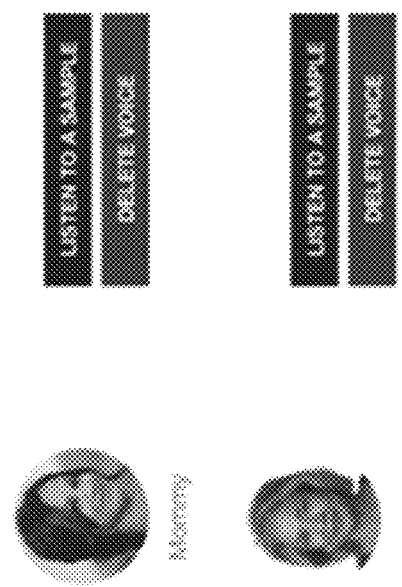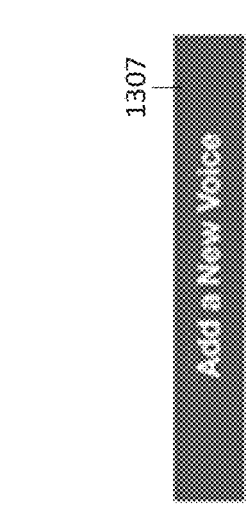
FIG. 13

ARTIFICIAL INTELLIGENCE PLATFORM WITH IMPROVED CONVERSATIONAL ABILITY AND PERSONALITY DEVELOPMENT

CROSS REFERENCES TO RELATED APPLICATIONS

This application is related to and claims priority from the following US patent applications. This application is a continuation of U.S. patent application Ser. No. 18/200,944, filed May 23, 2023, which is a continuation of U.S. patent application Ser. No. 16/193,845, filed Nov. 16, 2018, which claims the benefit of U.S. Provisional Application No. 62/589,316, filed Nov. 21, 2017, each of which is incorporated herein by reference in its entirety.

BACKGROUND OF THE INVENTION

1. Field of the Invention

The present invention relates to artificial intelligence, and more specifically to artificial intelligence related to digital assistants with artificial intelligence.

2. Description of the Prior Art

It is generally known in the prior art to provide "virtual assistants," or applications that provide feedback based on a user stimulus. Common examples of these virtual assistants include SIRI from APPLE, ALEXA from AMAZON, and GOOGLE ASSISTANT from GOOGLE. These systems are generally accessible through an application on a mobile phone or through a stand-alone "virtual assistant" device with a speaker. These systems generally respond to a user stimulus, for example a spoken or typed question, by retrieving information from a knowledge base and presenting that information through a visual indicator and/or an auditory response that is often constructed to imitate natural language phrasing. Furthermore, it is also known in the art to provide Artificial Intelligence (AI) systems that attempt to utilize large data sets (Big Data) in order to determine inferences about particular tasks or subject matters. Many of the current systems are QA-based or decision-based, meaning that that while answers are sometimes presented in a way that attempts to achieve natural language output, the answers are often mechanical, do not have any real semblance of personality, and do not react efficiently to personality and derived inferences from a user. IBM's WATSON is one example of AI that is built to generally be a Question/Answer (QA) system based on large datasets relevant to a given field.

Prior art patent documents include the following:

U.S. Pat. No. 9,721,004 for answering questions via a persona-based natural language processing (NLP) system by inventor Byron, et al., filed Jul. 12, 2014, and issued Aug. 1, 2017, is directed to a mechanism provided, in a question answering (QA) system, for performing persona-based question answering is provided. An identification of a requested persona is received from a user along with a natural language question input specifying an input question to be answered by the QA system. Responsive to receiving the requested persona, components of the QA system are customized to answer questions from a viewpoint of the requested persona. An answer to the input question is generated from the viewpoint of the requested persona based on the customization of the components of the QA system. The answer to the input question is output in a form representative of the requested persona.

US Publication No. 2018/0117479 for Voice-Enabled Connected Smart Toy by inventor Coolidge, et al., filed Sep. 13, 2017, and published May 3, 2018, is directed to a smart toy is provided. The smart toy includes a housing forming a zoomorphic shell for housing internal components. The smart toy also includes a microphone for receiving an audio signal from a child and a speaker for playing a responsive audio signal to the child. The smart toy further includes an actuator button and a microprocessor for establishing a voice call with a remote server when the actuator button is pressed. The microprocessor processes the audio signal received from the child and sends the audio signal to the remote server. The remote server processes the audio signal using a dialog engine and a knowledge database to generate the responsive audio signal which is tailored to the child and responsive to the audio signal. The remote server sends the responsive audio signal to the microprocessor to be played to the child.

U.S. Pat. No. 8,719,200 for cyberpersonalities in artificial reality by inventor Beilby, et al., filed Jul. 13, 2006, and issued May 6, 2014, is directed to cyberpersonalities, including their and varied use in artificial reality. A cyberpersonality is comprised of a base personality (12). The base personality (12) is selected from a set of base personalities, each one representing the personality of a theoretical person. The cyberpersonality also includes a dynamic personality (14) that reflects the actual person (real or company) that the cyberpersonality is meant to represent and is able to learn. Information contained in the base (12) and dynamic (14) personality can be used to allow the person that the cyberpersonality mimics to interact in the artificial reality without direct control. The cybersonality can chat with third parties, including asking questions and answering questions, so as to learn more about each other. Other uses are related to searching, advertising and direct marketing.

U.S. Pat. No. 9,716,674 for systems and methods for virtual interaction by inventor Ciofalo, et al., filed Aug. 22, 2014, and issued Jul. 25, 2017, is directed to in one aspect, at least one processor may receive a first user input and identify one or more first keywords from the first user input to determine one or more previously recorded outputs corresponding to the first keywords. The previously recorded outputs may correspond to a virtual character, such as a celebrity. Further, the at least one processor may select one of the determined previously recorded outputs and output the selected previously recorded output corresponding to the virtual character. The at least one processor may also identify one or more second keywords from at least the first user input, temporarily store the second keywords in memory in association with at least one portion of the user input, receive a second user input, and determine another previously recorded output based at least in part on the temporarily stored keywords associated with the first user input.

US Publication No. 2016/0196336 for Cognitive Interactive Search Based on Personalized User Model and Context by inventor Allen, et al., filed Jan. 2, 2015, and published Jul. 7, 2016, is directed to mechanisms, in a Question and Answer (QA) system, are provided for performing a personalized context based search of a corpus of information. A question is received, by the QA system, from a first user via a source device. A first user profile associated with the first user, which specifies a personality trait of the first user, is retrieved. First candidate answers to the original question are generated based on a search of a corpus and second users having a similar personality trait to the personality trait of the first user are identified. Similar questions to that of the original question, which were previously submitted to the QA system by the one or more second users are identified. Second candidate answers based on the one or more similar questions are generated by the QA system. A final answer based on the first candidate answers and the second candidate answers is generated and output to the user via the source device.

U.S. Pat. No. 8,150,695 for presentation of written works based on character identities and attributes by inventor Killalea, et al., filed Jun. 18, 2009, and issued Apr. 3, 2012, is directed to a method for presenting a written work. A character identity is recognized within a written work. Presentation information for the written work, such as a graphical scheme or an electronic voice, is determined based on the character identity. The presentation information is provided to a user computing device. The user computing device renders the written work or a portion thereof using the presentation information.

U.S. Pat. No. 9,318,113 for method and apparatus for conducting synthesized, semi-scripted, improvisational conversations by inventor Westby, et al., filed Jul. 1, 2013, and issued Apr. 19, 2016, is directed to simulating an improvisational conversation between two or more people (or between a person and himself at a later time) by recording an original conversation involving some of the people and annotating the recording to produce an interview source database, then receiving a statement from another of the people, matching the statement against the interview source database to obtain a suitable audio response in the voice of a participant in the original conversation, and playing the audio response for the speaker or sender of the statement.

U.S. Pat. No. 9,823,811 for Virtual assistant team identification by inventors Brown and Miller, filed Jun. 2, 2014, and issued Nov. 21, 2017, is directed to techniques and architectures for implementing a team of virtual assistants are described herein. The team may include multiple virtual assistants that are configured with different characteristics, such as different functionality, base language models, levels of training, visual appearances, personalities, and so on. The characteristics of the virtual assistants may be configured by trainers, end-users, and/or a virtual assistant service. The virtual assistants may be presented to end-users in conversation user interfaces to perform different tasks for the users in a conversational manner. The different virtual assistants may adapt to different contexts. The virtual assistants may additionally, or alternatively, interact with each other to carry out tasks for the users, which may be illustrated in conversation user interfaces.

SUMMARY OF THE INVENTION

The present invention relates to systems, methods, and apparatuses for an Artificial Intelligence (AI) platform with artificial personality and feedback capabilities developed based on inputs from a user, preferably by interactive inputs from at least one user. The inputs are built from external sources and/or human-AI interaction, preferably, via a combination of pre-existing data that is supplemented and/or modified by human interaction with the AI platform of the present invention. When external sources are input, the AI analyzes and extracts meanings, personalities, and ideas from keywords and phrases in the external sources and incorporates the extracted meanings, personalities, and ideas into interactions with a user. Through these interactions, the AI is additionally operable to analyze and extract meaning and personality from the user as well as recall and replay previous interactions.

It is an object of this invention to provide a system for improvement of personal relationships through quasi-human interaction and therapeutic development such that users are able to interact with a humanoid entity as well as achieve introspective analysis through AI-human interaction.

In one embodiment, the present invention provides an artificial intelligence (AI) system for improved conversation and artificial personality development comprising: a handheld toy, wherein the handheld toy includes at least one processor, at least one memory with at least one database, at least one motion sensor, at least one camera, at least one speaker, and at least one microphone; a virtual assistant (VA) service hosted on at least one server, wherein the VA service includes at least one VA processor and at least one VA memory with at least one VA database; wherein the at least one speaker and the at least one microphone are embedded in the handheld toy; wherein the handheld toy is in network communication with the VA service; wherein the handheld toy is operable to detect and record a stimulus and transmit the stimulus to the VA service via a network; wherein the stimulus includes a movement of the handheld toy, a sound, an image, or a video; wherein the VA service is operable to determine if the stimulus is a predefined movement, a speech input, a predefined face, or a gesture; wherein the VA service is operable to extract user personality features from gestures, tones, keywords, or phrases of the stimulus and determine a user personality score based on the user personality features; wherein the VA service is operable to construct at least one user profile and at least one personality profile and store the at least one user profile and the at least one personality profile in the at least one VA database; wherein constructing the at least one user profile includes matching the stimulus to personal data, including the user personality score, personally identifiable information, settings, and preferences; wherein constructing the at least one personality profile includes: receiving media inputs including a video, an audio clip, and/or text; extracting personality features from gestures, tones, keywords, or phrases of the media inputs; and determining a personality score based on the personality features of the media inputs; wherein the VA service is operable to construct a response based on the personality score and the user personality score and transmit the response to the handheld toy; wherein the response is a movement response, a sound response, an image response, or a video response; and wherein the handheld toy is operable to demonstrate the response.

In another embodiment, the present invention provides a method for using artificial intelligence (AI) for conversational interaction and artificial personality development comprising: providing a handheld toy, wherein the handheld toy includes at least one processor, at least one memory with at least one database, at least one motion sensor, at least one camera, at least one speaker, and at least one microphone; providing a virtual assistant (VA) service hosted on at least one server, wherein the VA service includes at least one VA processor and at least one VA memory with at least one VA database; wherein the at least one speaker and the at least one microphone are embedded in the handheld toy; wherein the handheld toy is in network communication with the VA service; the handheld toy receiving a stimulus, recording the stimulus, and transmitting the stimulus to the VA service via a network; wherein the stimulus is a movement of the handheld toy, a sound, an image, or a video; the VA service determining if the stimulus is a predefined movement, a speech input, a predefined face, or a gesture; the VA service extracting user personality features from gestures, tones, keywords, or phrases of the stimulus and determining a user personality score based on the user personality features; the VA service constructing at least one user profile and at least one personality profile and storing the at least one user profile and the at least one personality profile in the at least one VA database; wherein constructing the at least one user profile includes matching the stimulus to personal data, including the user personality score, personally identifiable information, settings, and preferences; wherein constructing the at least one personality profile includes: receiving media inputs including a video, an audio clip, and/or text; extracting personality features from gestures, tones, keywords, or phrases of the media inputs; and determining a personality score based on the personality features of the media inputs; the VA service constructing a response based on the personality score and the user personality score and transmitting the response to the handheld toy; wherein the response is a movement response, a sound response, an image response, or a video response; and the handheld toy demonstrating the response.

In a further embodiment, the present invention provides an apparatus for using artificial intelligence (AI) for conversational interaction and artificial personality development comprising: a handheld toy, wherein the handheld toy includes at least one processor, at least one memory with at least one database, at least one motion sensor, at least one camera, at least one speaker, and at least one microphone; wherein the at least one speaker and the at least one microphone are embedded in the handheld toy; wherein the handheld toy includes a virtual assistant (VA) service stored on the at least one memory; wherein the handheld toy is operable to detect and record a stimulus and process the stimulus via the VA service; wherein the stimulus is a movement of the handheld toy, a sound, an image, or a video; wherein the VA service is operable to determine if the stimulus is a predefined movement, a speech input, a predefined face, or a gesture; wherein the VA service is operable to extract user personality features from gestures, tones, keywords, or phrases of the stimulus and determine a user personality score based on the user personality features; wherein the VA service is operable to construct at least one user profile and at least one personality profile and store the at least one user profile and the at least one personality profile in the at least one database; wherein constructing the at least one user profile includes matching the stimulus to personal data, including the user personality score, personally identifiable information, settings, and preferences; wherein constructing the at least one personality profile includes: receiving media inputs including a video, an audio clip, and/or text; extracting personality features from gestures, tones, keywords, or phrases of the media inputs; and determining a personality score based on the personality features of the media inputs; wherein the VA service is operable to construct a response based on the personality score and the user personality score; wherein the response is a movement response, a sound response, an image response, or a video response; and wherein the handheld toy is operable to demonstrate the response.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 13 is an application GUI illustrating one storybook embodiment with voice management according to the present invention.

FIG. 14 is an application GUI illustrating one storybook embodiment with voice recording according to the present invention.

DETAILED DESCRIPTION

Figure 1:
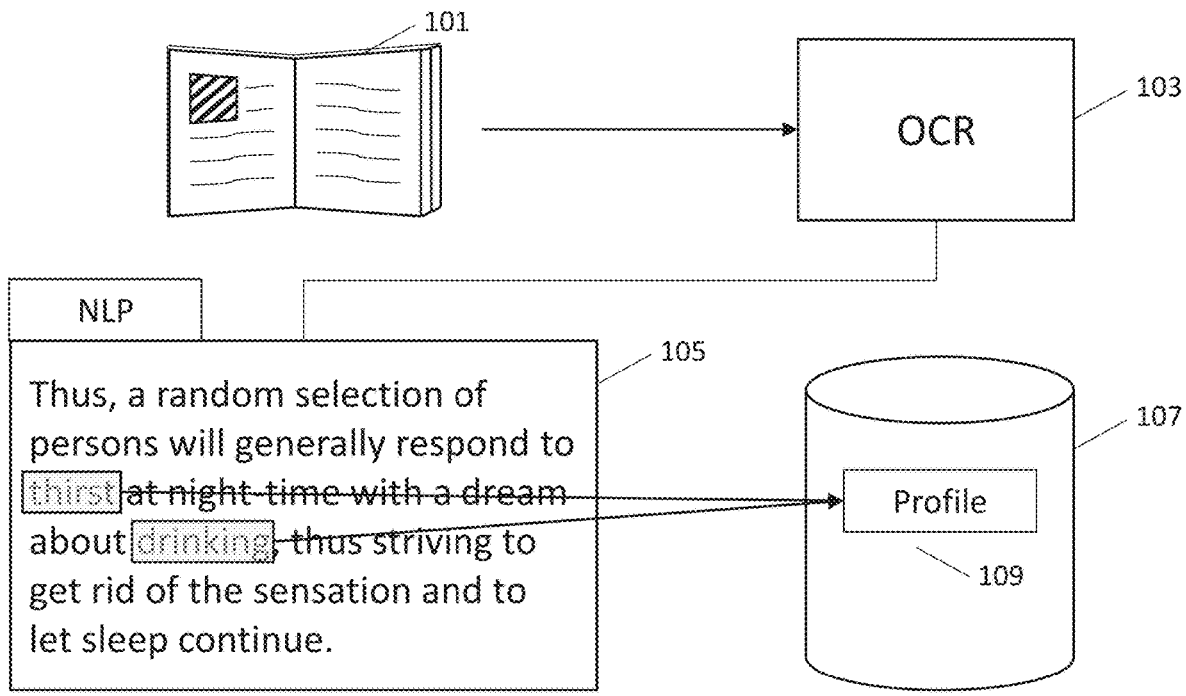
FIG. 1 illustrates one embodiment of the external source extraction system of the present invention.

The present invention provides systems, methods, and apparatuses for an Artificial Intelligence (AI) platform having at least one artificial personality and feedback capabilities developed with inputs from a user, preferably by interactive inputs from at least one user. The inputs are built from external sources and/or human-AI interaction, preferably, via a combination of pre-existing data that is supplemented and/or modified by human interaction with the AI platform of the present invention.

Generally, the present invention is directed to an Artificial Intelligence (AI) system with interactive, conversational behavior capabilities, natural language processing (NLP), and external input functions that combine to develop an AI personality. The AI does not function as a simple question-answer system but instead provides a system for users to interact in a quasi-human manner with an AI that is developed and customized based on interactions with the user and/or input external sources. The system supplements human interaction by taking on a role as life coach, therapist, friend, and/or entertainer. Additionally, it is a goal of this invention to allow for the development of an artificial personality based on a body of recorded work. In one embodiment, the personality is based on a historical figure, such as Sigmund Freud, wherein media sources that were created by the historical figure, such as books by Sigmund Freud, are processed through the system to extract meaning, personality, and relevant information from keywords, phrases, and ideas. In other embodiments, a user is operable to record him- or herself, wherein the system processes the recording in a similar manner so as to extract meaning, personality, and relevant information. Thus, a user is operable to converse with historical figures and derive information or advice from the figures as well as record, analyze, and derive meaning from personal interactions with the AI.

In one embodiment, the present invention provides an artificial intelligence (AI) system for improved conversation and artificial personality development comprising: a handheld toy, wherein the handheld toy includes at least one processor, at least one memory with at least one database, at least one motion sensor, at least one camera, at least one speaker, and at least one microphone; a virtual assistant (VA) service hosted on at least one server, wherein the VA service includes at least one VA processor and at least one VA memory with at least one VA database; wherein the at least one speaker and the at least one microphone are embedded in the handheld toy; wherein the handheld toy is in network communication with the VA service; wherein the handheld toy is operable to detect and record a stimulus and transmit the stimulus to the VA service via a network; wherein the stimulus includes a movement of the handheld toy, a sound, an image, or a video; wherein the VA service is operable to determine if the stimulus is a predefined movement, a speech input, a predefined face, or a gesture; wherein the VA service is operable to extract user personality features from gestures, tones, keywords, or phrases of the stimulus and determine a user personality score based on the user personality features; wherein the VA service is operable to construct at least one user profile and at least one personality profile and store the at least one user profile and the at least one personality profile in the at least one VA database; wherein constructing the at least one user profile includes matching the stimulus to personal data, including the user personality score, personally identifiable information, settings, and preferences; wherein constructing the at least one personality profile includes: receiving media inputs including a video, an audio clip, and/or text; extracting personality features from gestures, tones, keywords, or phrases of the media inputs; and determining a personality score based on the personality features of the media inputs; wherein the VA service is operable to construct a response based on the personality score and the user personality score and transmit the response to the handheld toy; wherein the response is a movement response, a sound response, an image response, or a video response; and wherein the handheld toy is operable to demonstrate the response.

In another embodiment, the present invention provides a method for using artificial intelligence (AI) for conversational interaction and artificial personality development comprising: providing a handheld toy, wherein the handheld toy includes at least one processor, at least one memory with at least one database, at least one motion sensor, at least one camera, at least one speaker, and at least one microphone; providing a virtual assistant (VA) service hosted on at least one server, wherein the VA service includes at least one VA processor and at least one VA memory with at least one VA database; wherein the at least one speaker and the at least one microphone are embedded in the handheld toy; wherein the handheld toy is in network communication with the VA service; the handheld toy receiving a stimulus, recording the stimulus, and transmitting the stimulus to the VA service via a network; wherein the stimulus is a movement of the handheld toy, a sound, an image, or a video; the VA service determining if the stimulus is a predefined movement, a speech input, a predefined face, or a gesture; the VA service extracting user personality features from gestures, tones, keywords, or phrases of the stimulus and determining a user personality score based on the user personality features; the VA service constructing at least one user profile and at least one personality profile and storing the at least one user profile and the at least one personality profile in the at least one VA database; wherein constructing the at least one user profile includes matching the stimulus to personal data, including the user personality score, personally identifiable information, settings, and preferences; wherein constructing the at least one personality profile includes: receiving media inputs including a video, an audio clip, and/or text; extracting personality features from gestures, tones, keywords, or phrases of the media inputs; and determining a personality score based on the personality features of the media inputs; the VA service constructing a response based on the personality score and the user personality score and transmitting the response to the handheld toy; wherein the response is a movement response, a sound response, an image response, or a video response; and the handheld toy demonstrating the response.

In a further embodiment, the present invention provides an apparatus for using artificial intelligence (AI) for conversational interaction and artificial personality development comprising: a handheld toy, wherein the handheld toy includes at least one processor, at least one memory with at least one database, at least one motion sensor, at least one camera, at least one speaker, and at least one microphone; wherein the at least one speaker and the at least one microphone are embedded in the handheld toy; wherein the handheld toy includes a virtual assistant (VA) service stored on the at least one memory; wherein the handheld toy is operable to detect and record a stimulus and process the stimulus via the VA service; wherein the stimulus is a movement of the handheld toy, a sound, an image, or a video; wherein the VA service is operable to determine if the stimulus is a predefined movement, a speech input, a predefined face, or a gesture; wherein the VA service is operable to extract user personality features from gestures, tones, keywords, or phrases of the stimulus and determine a user personality score based on the user personality features; wherein the VA service is operable to construct at least one user profile and at least one personality profile and store the at least one user profile and the at least one personality profile in the at least one database; wherein constructing the at least one user profile includes matching the stimulus to personal data, including the user personality score, personally identifiable information, settings, and preferences; wherein constructing the at least one personality profile includes: receiving media inputs including a video, an audio clip, and/or text; extracting personality features from gestures, tones, keywords, or phrases of the media inputs; and determining a personality score based on the personality features of the media inputs; wherein the VA service is operable to construct a response based on the personality score and the user personality score; wherein the response is a movement response, a sound response, an image response, or a video response; and wherein the handheld toy is operable to demonstrate the response.

None of the prior art discloses developing an interactive AI personality through both interaction and an analysis of external sources in combination with NLP, recommendations, and user profiles. While the prior art has generally focused on developing simple question-answer systems, no platforms to date have provided the AI personality extraction and development features enabled by the present invention.

The present invention provides for an AI system that is more than a simple question-answer virtual assistant. Instead, the present invention is directed to an AI with personality analysis and development capabilities for both interactional data and external inputs. Preferably, the AI platform is hosted on a server and is in network communication with a device and/or is embedded on the device, wherein the device is operable to receive inputs from a user. The device is any electronic computing device with at least a memory and a processor, including but not limited to electronic devices in the field of mobile phones, dolls, toys, or robotics. Personalities and profiles of the AI are represented in visual or audial media, including digitally rendered virtual avatars and sprites, "chat bots," virtual assistants, or any other method known to convey digital representations of personalities. The platform includes at least a server with a processor, memory, and database, as well as a sensor for collecting user data, including a microphone, a camera, a gyroscope, an accelerometer, a barometer, and a geolocation positioning system. The interactional data and external inputs, or the raw data, is collected by the platform through these sensors and is stored in the memory and database. Raw data is further analyzed by the AI engine, whereby keywords, phrases, and ideas are extracted and recommendations are prepared. The extracted keywords, phrases, and ideas are stored in the memory and database, wherein each keyword, phrase, or idea is analyzed for relevance to each other and to set categories or customized goals. In another embodiment, connotation(s) of keywords and phrases are extracted, stored, and analyzed. Each element of the extracted data is stored with a link to a corresponding user profile such that the raw data is relevant to a specific user. Upon categorizing and tagging the extracted elements, the AI utilizes NLP to derive a meaning from each word, phrase, or idea and update a personality of a user profile. Meanings for each word, phrase, or idea as well as semantic trends determined for the extracted words are stored in a user profile. In one embodiment, predetermined semantic categories are stored in the AI system and each word, phrase, or idea is matched to one of the predetermined semantic categories based on the context of the word, phrase, or idea, and a calculated relevance to a semantic category. Recommendations for responses to user interactions based on the analysis and matching are provided by the AI system.

The user profile is further developed through manual user input of personally identifiable information, including personal information such as a name, birthdate, address, occupation, height, weight, health history, and/or family information. In one embodiment, the information is manually entered by a user upon first interaction with the AI system. In another embodiment, the information is compiled through user interaction with the AI. For example, the AI is operable to ask the user, "What is your birthday?" A user response to the question is then stored in the user's corresponding user profile. Upon development of the user profile, the system is operable to respond to a stimulus from a user (e.g., a question, a movement, a touch, or a sound) based on the analysis of the raw data. The response includes actions based on a set goal, personality trait, or projected counter response from the user. In yet another embodiment, the profile is developed based on one or more existing online profiles or data, including social media profiles, social media activity, website browsing history, purchase data, etc.

Interaction Raw Data

In one embodiment, the raw data is obtained through interaction data. As a user interacts with the AI, each interaction is analyzed, categorized, tagged, and stored in the memory and database. The system captures the interaction through a variety of sensors and stores this interaction in the memory and database. Sensors include any electronic medium through which the device is operable to receive and record an input, including pressure sensors, electromagnetic sensors, microphones, cameras, and/or chemical sensors. These sensors are preferably embedded within a computer device. For example, in one embodiment, a user talks to the AI, whereby the speech input is recorded through a microphone and stored in the memory and database. The NLP system then converts the spoken word through Speech-To-Text (STT) and extracts words, phrases, or ideas from the text and categorizes each extracted element in the memory and database. In one embodiment, the extracted elements are categorized according to each extracted element type. The AI is operable to develop a user profile for the user and determines the words, phrases, or ideas that are most common to the user. In a further embodiment, the extracted elements are compared to pre-built personality profiles and matched with at least one of these personality profiles. When responding or interacting with the user, the AI is thereby operable to load a matched personality profile and respond with a tone, manner, or phrasing dictated by the matched personality profile. For applications to robotics, virtual avatars and sprites, and/or holograms, the sensors are further able to capture and store interaction data relating to a user's actions and facial or body movements. Physical actions and movements are processed in a similar manner to language, wherein meaning is derived from the actions by correlating the actions or movements with specific meanings and concepts and prior correlation datasets.

Preferably, the AI is operable to learn a user's voice pattern over time. For example, in one embodiment, the AI uses machine learning technology, including artificial neural networks or fuzzy logic, in order to develop a model of a user's voice. Speech patterns are developed and stored for identification of the user and for more accurate interpretation of the spoken words and phrases. Voice models are stored with a user profile. Upon receiving vocal input, the input is compared to stored voice models and a corresponding user profile identified. Alternatively, models are not limited to voice models but are also built from other user interactions and biometrics. For example, in one embodiment, the AI is built into a television and is operable to use facial recognition hardware and analytics in order to determine a user sitting in front of it and load the corresponding user profile. The recognition can be used in order to deliver highly customized content, such as a television automatically delivering the next episode in a television series that a user is watching or a computerized, read-aloud storybook automatically loading the voice of a parent upon detection of a child's face. In another embodiment, the recognition is built into a doll or figurine, wherein a model is built based on facial detection during use. The doll or figurine is further operable to enter into a low-power mode where only facial recognition features are active. Upon detection of a user with a facial recognition model, the device activates a normal power mode and/or initiates an action, such as playing an audio clip, "Hello!" and activating a mechatronic arm wave motion to indicate a recognized presence.

The user profile is further configured to store goals, ambitions, or desires related to the user. In one embodiment, these are extracted from the user interaction based on explicit or implicit concepts extracted and determined from the raw data. For example, if a user has a goal of developing optimism, the system is operable to categorize the extracted data relative to the determined optimism level. During interaction, the AI then acts on this goal by encouraging optimism through either acknowledging pessimistic interactions or through reciting audio and audio clips that encourage optimistic attitudes. The audio and audio clips include quotes from the user; quotes from historical figures, relatives, friends, etc.; prior instances of optimism as observed by the AI, etc.

Interaction data includes speech, touch, movement, or any other action that is capable of being captured by the sensors and recorded in the memory of the system. In one embodiment, the interaction data includes a user talking to the AI, such as recording a diary or journal entry, wherein the speech is recorded, stored, analyzed for keywords, phrases, and ideas, and is stored in the memory. In another embodiment, the interaction data includes moving the AI device to a different location, wherein the change in location is recorded and stored. Data are stored in the memory and database of the device with a time, date, length of interaction, type of interaction, and other quantitative or qualitative indicators necessary for analysis and recall by the AI. Activation of the data collection and processing is initiated through at least one of the group including: a keyword or phrase spoken by a user, a physical button on an AI-embedded device, an always-on listening service, and/or a physical movement.

The AI system is operable to allow the user to customize user profiles and/or personality profiles. Customization occurs through a graphical user interface or through verbal or gesture-based interaction with the AI. In one embodiment, a user describes through dictation traits desired in a profile. The AI processes the speech to determine a correlation value between the desired characteristics and at least one personality profile and/or category. The profile is then populated with attributes from the at least one correlated personality profile and/or category. Once a profile has been populated with characteristics, the AI system is operable to allow the user to add, remove, or delete profile elements through the graphical user interface or through verbal or gesture-based interaction with the AI system.

The AI is further operable to replay interactions with a user. For example, upon request of a user, the AI describes trends, categories, or analysis relative to the raw data. In one embodiment, a user may utilize the AI as a dream journal, wherein a user speaks to the AI or inputs written accounts of a dream to the system. Upon request, the AI is then operable to respond with the number of times that a user has reported dreaming about a particular topic or how often nightmares have occurred. For example, if a user asks, "When was the last time I had a nightmare?" the AI is operable to respond, "Your last nightmare was on Aug. 27, 1994." Based on this data, the AI is then further operable to provide interpretations of the dreams by retrieving relevant information from a database. For example, if a user asks about a particular symbol in the dream, the AI retrieves information corresponding to the interpretation and definition of a symbol from a database and presents the information to the user.

As a user continues to interact with the system and more raw data is collected, the AI system continues to develop the user profile. As the profile is developed, the AI is operable to analyze and record how users act in response to audial and visual stimuli from the system in conversations, responses, or questions. In one embodiment, elements of the extracted data are stored in a new personality profile. The AI is then operable to compare and match to the new personality profile such that responses match or are similar to the tone, manner, or phrasing of the new personality profile. In further embodiments, extracted audio and text is replayed in response to stimuli from the user. In this way, a personality is operable to be captured and stored in the system and the AI is operable to take on the persona of the captured user. Responses thus include direct quotations, audio clips, and ideas from the user profile as well as a tone, manner, and or phrasing similar to that of the user profile. In some embodiments, extracted audio is analyzed for common phonics, tones, and speech patterns, and these phonics, tones, and speech patterns are extracted and replayed in a manner that allows for construction of words and phrases that were not directly recorded in the user interaction.

The interaction development provides for increased conversational ability, as the words, phrases, and ideas that the user communicates with are collected, learned, and eventually used by the AI to converse and interact with the user in a manner that he or she finds most understandable and relatable. Preferably, the AI engages in conversations with the user beyond question-and-answer style interactions. Instead, as the interaction data is compiled and grows, the AI is operable to draw on relevant concepts previously conversed and reiterate these elements to the user. Upon discussing a concept or idea, the element is subsequently updated with any new or changed information relating to that topic. For example, if a user indicates that his or her favorite color is blue, the response is stored in a memory and database. If, later, the same user indicates that his or her favorite color is green, the stored response to include an original favorite color and a new favorite color. In reply to the question "What is my favorite color?" the AI accesses the response history and/or user profile from the memory or database and states, "Your favorite color was blue, but now it is green."

In one embodiment, the memory and database are in network communication with the AI system and are accessible over the Internet. In another embodiment, the memory and database are in local network communication with the AI system. The AI system is either embedded into a device, such as a smart speaker or smartphone, or is hosted on the Internet and supports a number of devices in network communication with the AI system. For example, in one embodiment, when a user interacts with the system, the interaction is processed by the device, sent to the AI system over the Internet, whereupon the AI system receives the interaction, determines a response based on a user profile or other stored data, and sends the response to the device. The device receives and performs the response. A response is any sort of stimulus in response to an interaction, including a movement, audio playback, video playback, picture display, or animatronic action (i.e., activating an artificial crying mechanism or activating a motor in a toy). In a further embodiment, the AI system is embedded within a standalone module or chip that is operable to be integrated within an electronic system, such as a desktop computer, mobile phone, or electronic toy. The module or chip is, in one embodiment, constructed with a standalone processor, memory, power, and communication ports.

External Raw Data

One embodiment of the present invention is an external analysis and personality extraction engine, whereby sources other than user interaction are utilized to build the raw data set. External sources include written media (e.g., books, articles, letters, or online posts), video recordings (e.g., video files, news clips, television shows, or movies), and audio recordings (e.g., audio files, voice memos, or podcasts). External data is stored in the database in a similar manner to the interaction data, wherein the data is analyzed with the NLP engine, identified and extracted according to words, phrases, or ideas, and categorized and tagged according to keywords, meanings, emotions, or ideas. The difference between the interaction data and the external data is that the external data is generally not built from the direct interaction data with the user. The AI is operable to create profiles based on the external data. The loading and matching of these profiles thus allow for the user to interact with a profile built from external sources.

For example, in one embodiment, the external sources include importing podcasts and recordings with a host that a user wishes the AI to imitate. Upon analysis and extraction of the podcast recording, the AI creates a personality profile for the host. In response to a question, the AI responds in a manner that the host would respond. For example, if asked "What is your name?" the AI responds by stating the name of the host or playing an audio clip of the host stating his or her name. In another example, if asked "What is the measure of success?" the AI responds in a manner similar to the analyzed personality of the host. If the extracted data indicates that the host generally is focused on money, the AI responds by saying, "Success is measured in the amount of money earned in life." If the extracted data indicates that the user is focused on happiness, the AI responds by saying "Success is measured by how happy you are." Each of these examples are provided in order to illustrate specific embodiments of the present invention and are not intended to limit the invention in any way.

External data also includes written materials manually input by the user. For example, in one embodiment, diary entries are input to the system through a scanner, photograph, or other method, and analyzed through an Optical Character Recognition (OCR) engine. The NLP engine then extracts the meanings, emotions, and ideas from the diary entries and provides analytics to the user based on the diary entries. Analytics in this embodiment include quantitative trends, semantics, and relationships to goals or ambitions. Semantics, meanings, and keywords are extracted through NLP. The NLP engine is further operable to extract meanings and ideas from words, phrases, and ideas in textual, audial, or visual input data and/or from audial or visual input data converted to textual data. Trends, semantics, and relationships are derived through comparing extracted words, phrases, and ideas to pre-calculated semantic categories and relationships. For example, in one embodiment, the device connects to an external server with a memory and a database and the extracted words, phrases, and ideas are compared to similar words, phrases, and ideas tagged with specific categories of meanings, attitudes, or concepts stored in the server. A value indicating the relevance to the specific meaning, attitude, or concept is generated. Based on the comparison and the values generated, the AI stores the highest correlated compared category or categories in the user profile along with the extracted data. In one embodiment, the comparison occurs at the remote server and results of the comparison are transmitted over a computer network to the device. In another embodiment, the comparison occurs at the device level.

For example, if the phrase "I had a good day today" is communicated to the AI, the AI is operable to process and assign a corresponding correlation value or personality score to the phrase. In one embodiment, the correlation value is calculated on a scale from 0 to 1, wherein "0" implies no correlation and "1" includes a definite, positive correlation. Thus, in this embodiment, when the phrase "I had a good day today" is compared to other words, phrases, and ideas in an external database, the external server returns a correlated category and correlation value (e.g., "happiness, 0.7" or "contentment, 0.6"). In another example, if the phrase "I had a great day today" is correlated to a database, the word "great" in context returns a response: "happiness, 0.9; contentment 0.9."

The tone of a user's voice and the context within which a word, phrase, or idea is communicated affects the meaning of the communication. Thus, NLP of the present invention further includes tone and context analysis and allows for development and customization of user profiles and user analytics based on these variables. Responses are, in one embodiment, constructed with a personality score equal to a personality score of a user or an artificial constructed personality in order to match syntax and tone of an imitated user or artificial personality. Modifications to the personality score include adjusting specific emotional or other personality parameters and metrics in order to encourage a specific response from an interacting user and/or to follow a specific lesson plan or goal stored in a user profile.

Additionally, the AI system is operable to continuously develop AI profiles based on both interaction data and external media sources. For example, as a user interacts with the AI system more, responses and interactions become more tailored to the user. If the AI system detects that a user is upset and a user profile of the child indicates that a hug is more likely to result in a positive change in attitude than a positive audial message, the AI system responds with "Would you like a hug?" External media sources further change the AI system personality and responses. For example, a doll based on a popular television show is able to continuously import an episode script, extracted dialogue, pictures, videos, or sounds, and use the extracted data in order to change the personality and responses available during interactions. If the television show character highlights a new "word of the week" on an episode, the AI system extracts the word from the released episode and adjusts its response options and personality profile to use the word of the week more often in conversation. In one embodiment, the system connects to external media streaming and viewing history services to determine shows and episodes that a user has watched for a specific series. The AI system is operable to activate a spoiler-free mode, wherein content from episodes, shows, or series not marked as watched by the user are not imported or are not used in determining appropriate responses.

The systems, methods, and apparatuses of the present invention preferably have connections to cloud computing and Internet of Things (IoT) applications. Cloud computing relates generally to distributed computing across one or more servers connected over the Internet. In the present invention, the AI system utilizes cloud network computing to store raw data, analyzed data, and extracted data online as well as harness distributed computing power in order to process the raw data. The present invention in a further embodiment includes a cellular data connection and is mobile. For example, the device in one embodiment includes a Subscriber Identity Module (SIM) card, eSIM card, and/or is connected via a cellular antenna to a Code Division Multiple Access (CDMA) or Global System for Mobile (GSM) network and is operable to receive and transmit using any generation of mobile Internet technology standard, such as Enhanced Data for Global Evolution (EDGE), Evolution Data Optimized (EvDO), High Speed Packet Access (HSPA), Long Term Evolution (LTE), LTE-Advanced, or WiMAX. Thus, the device in this embodiment is portable and operable to store, access, and/or process interactions over the Internet from any location with cellular service. In a further embodiment, the device is equipped with mobile voice communication radios and protocols for connecting to a cellular network and sending and receiving voice communication. Networks include any generation of cellular communication, such as GSM, CDMA, LTE, and corresponding voice communication systems, such as Voice over LTE (VoLTE).

The system is operable to allow manual import of the external data, through scanning, file uploading, or manual data entry, or in further embodiments, the system is operable to connect to an external server and database and load information from the external server. The external server is operable to protect the data through access control for user accounts and passwords or is further operable to encrypt the data and allow decryption only through providing a key or other decryption value. In one embodiment, users are operable to purchase data through the external server. The external server is operable to hold personality profiles, user profiles, and raw data corresponding to a specific user, or extracted data from the raw data corresponding to the specific user. In this manner, an external entity is able to sell a particular personality to users of the AI system. For example, if a user wants to purchase the personality of Sigmund Freud, the user downloads the personality from the external database and is instantly able to converse with the Sigmund Freud AI.

Further IoT connections include "connected" AIs that are operable to exchange data over a network. For example, in one embodiment a personality profile is developed based on interaction with multiple users. As a user interacts with the AI, provides answers to questions, and provides external raw data, the personality profile is updated and synchronized with other AIs. This synchronization occurs over a cloud-based network or through multiple devices connected to the same local network. In alternative embodiments, personality profiles, user profiles, raw data, and extracted data is communicated over the same networks and is shared to other users. In this way, a user's profile, personality, experience, or content is shared to a second user. The sharing features provide benefits to families that are separated by long distances, loved ones who have passed away, or friends who want to keep connected to each other.

Thus, the AI system is operable to provide social features for developing and sharing AI profiles and data. In one embodiment, the device upon which the AI is embedded allows for sharing from person to person through wireless technology, for example through a NEAR FIELD COMMUNICATION (NFC)-triggered data exchange over BLUETOOTH. In another embodiment, the sharing occurs through accounts on the cloud computing network. In this embodiment, a user creates an account with central or distributed server. When the user creates the account, he or she is then prompted to enter in a code corresponding to the AI system (e.g., a serial number or unique identification) to provision the system and connect it to the user account. When the AI system connects to a network, it then synchronizes raw data, extracted data, profiles, and other information to the cloud computing network and the user account. Any data synchronized over the cloud computing network is operable to be shared by the user to other users. The sharing occurs through any digital communication method available, including an instant message, an email, a text message, or through proprietary sharing software on the cloud computing network. Once the sharing occurs, data is automatically synchronized to the account of the recipient of the sharing. The AI of the recipient is then operable to synchronize automatically with the shared data in the account or wait for an indication from the recipient to synchronize the data.

Toy Embodiment

The AI is operable to be implemented as a standalone operating system, an application on a device, or in any other manner that allows for interaction with a user through sensory input. In one embodiment, the AI is built into a toy or doll, which allows for interaction and AI development through human physical and verbal interaction. In one example, a Wonder Woman action figure with a camera, speaker, internal processor, memory, and database contains the AI system and interacts with users according to the personality of Wonder Woman. The Wonder Woman profile is operable to be extracted from movies about the character, comic book issues about the character, or pre-programmed personality traits. In conversing with a user, the action figure retrieves quotes from a Wonder Woman movie and replays them relevantly in response to a user stimulus. Based on specific keywords spoken by a user, Wonder Woman replies with responses tagged relevant to that keyword. If an answer is unknown, a predetermined response is played for the user. For example, if the user asks, "What is my favorite color?" and this information is not stored in the user profile, Wonder Woman responds with "Someone in the room may know," or "I do not know. What is your favorite color?" As with other information learned from interaction, user answers to unknown questions are stored in the user profile and are retrieved in future scenarios relevant to that question. In certain embodiments, toys are operable to encourage the character's personality traits in the user. In this way, a pre-set goal is implemented in the AI relative to the user, and the AI provides phrases, conversation, or other interaction that relates to the pre-set goal.

The voice of the toy is either directly obtained from media clips or alternatively is a simulated voice derived from analyzed speech patterns of the movie clips. In an alternative embodiment, the voice includes recorded audio files that are pre-loaded into the system.

Profiles in toys are further operable to be customized by a user, such that desired personality traits and characteristics replace or are combined with a default personality profile. Custom personality traits are developed through user interactions (e.g., verbal, gestural, or GUI-based inputs) based on user direction or through synchronization to a database of user-customized profiles. Profiles are updated and loaded in real-time or through a synchronization process through network communication with an external server.

In another embodiment, a toy is operable to detect a user via one or more user biometric parameters obtained from a camera, microphone, or other sensor. For example, if the toy detects a face and matches the detected facial features to a user profile that often plays with it, the toy responds with "Good to see you again!" and/or changes from a low-power mode to a normal-power mode. Additionally, the system is able to learn from the biometric parameters in order to develop a model that continuously improves biometric identification through subsequent interactions.

The toy is, in one embodiment, constructed with sensors in positions that are anatomically similar to humans. For example, a microphone is embedded within an artificial ear, a camera is embedded within an artificial eye, and a speaker is embedded within an artificial mouth. In another embodiment, a chip or module with an embedded AI system is constructed within a head or heart of an anatomic doll. Thus, the combination of the toy construction and the personality development provides a device that imitates and encourages human interaction in a manner that has not previously been possible in the prior art.

Gaming Embodiment

Notably, a toy is not limited to a physical toy but in further embodiments the system is included in other forms of entertainment, including virtual characters, such as avatars and sprites in video games or augmented and virtual reality. Gaming applications of the AI system include the development of character profiles, wherein a character within a videogame exhibits personality traits and tendencies encapsulated in the character profile. The character profile is developed by the AI through interaction data with a user. For example, in one embodiment data from a user's profile is duplicated for a character profile, wherein the character reflects personalities and preferences of the user. Preferably, the character profile is customizable such that a user can dictate which personality traits and mannerisms the character exhibits. Customization allows a user to choose from a selection of personality categories to attribute to the character profile. The categories are stored in an external database in network communication with the AI system and are optionally downloaded to the AI system upon selection by the user. The system is operable to allow selection through a graphical user interface or through verbal or gesture-based interaction with the AI. In one embodiment, a user describes through dictation the character traits desired in a character profile and the AI processes the speech to determine a correlation value between the desired characteristics and at least one personality profile and/or category. The character profile is then populated with attributes from the at least one correlated personality profile and/or category.

Character profiles have applications to both virtual and augmented reality, wherein based on characteristics input by a user, a virtual or augmented avatar or sprite is displayed embodying the personality and appearance of profile characteristics. The AI system is further operable to determine appearance characteristics based on stored profile elements. For example, if a personality profile characteristic includes "strong," the AI is operable to retrieve relevant muscle size and appearance from an internal or external memory and display the corresponding appearance in a virtual or augmented reality avatar or sprite. In a further embodiment, a virtual or augmented reality avatar or sprite is created by the AI system such that the avatar or sprite mimics the full appearance and personality traits stored in a user's profile and serves as a "digital clone" of a user.

Therapy and Counseling Embodiment

In another embodiment, the AI is operable to provide counseling to a user and encourage certain behaviors or the development of certain personality traits. For example, in one embodiment the AI is implemented into a speaker system. The AI is operable to store guidelines for interacting with certain behaviors. If a user indicates that he or she wishes to develop optimism, the AI loads extracted data relative to optimism and converses with a user based on the extracted data. The extracted data is derived from external data or is pulled from user interaction data relative to optimism. For example, if one external source is a psychologist's written work on optimism, the AI loads relevant keywords, phrases, and ideas from the written work and either reads quotes from the written work or develops responses combining keywords, phrases, and ideas from the written work with historical user interaction data. By replaying recordings from previous user interactions, the AI is further operable to document a change in a user's personality and encourage specific goals set by the user. Counselling interactions are highly customizable in that the user is able to choose a specific goal, trait, or situation that he or she wishes to develop. These customizations are stored in user profiles.

The AI is additionally operable to process the extracted data to determine an emotional state of a person. For example, based on the extracted interaction data, the AI system is operable to implement NLP tools in order to categorize words, phrases, and ideas and correlate the categorized words, phrases, and ideas to emotional states and personalities. Thus, a counseling or therapy mode of the AI determines a current state of the user and matches the current state of the user to a set goal for an emotional state. Interactions between the AI and users are operable to be recorded and anonymized in order to develop a database of words, phrases, and ideas used by the AI and user words, phrases, ideas, and emotional states given in response to the AI interaction. The AI system is operable to use machine learning tools in order to determine a most beneficial response to a user based on previous responses that have yielded successful achievement of a specific goal (e.g., a user word, phrase, idea, or emotional state) in past interactions. The system is operable to create an alert if a specific emotional state or emotional score meets a specific threshold. For example, if a happiness score is below a specific set value, an alert is sent to a connected device of a relative or friend. In another embodiment, if an emotional score is below a specific value, the system automatically connects to another device or calls a phone number via a phone network such as a 1G, 2G, 3G, 4G, or 5G network, a Voice over IP (VoIP) network, or other internet voice or video communication service and allows an interacting user to converse with a second party.

Based on a lesson plan or goal, the AI system is further operable to retrieve customized content and display the content to the user. For example, the system is operable to access a database and determine a podcast with a specific goal of encouraging a particular emotional state or developing a life goal. The system is operable to determine an appropriate podcast based on metadata associated with the podcast or based on processing of the audio file using AI and NLP. The podcast is then downloaded to the device and played back.

The AI is further operable to estimate a score for emotional intelligence (EI), emotional quotient (EQ), and intelligence quotient (IQ) for a particular user based on interactions and responses recorded by the system. Analysis of responses in one embodiment occurs outside of goal or lesson plan-driven interactions. In another embodiment, a goal or lesson plan is set, wherein specific questions are provided and responses are recorded, processed, and scored. For example, the AI system is operable to implement NLP and machine learning to determine that a user's EQ is lower than a set goal and adjust delivered content, a goal, or a lesson plan to include exercises intended to improve a user EQ score.

Imaginary Friend Embodiment

In addition to characters derived from external sources, the AI is operable to use the input data to develop a secondary user profile (a character profile) based on interaction data from a user. For example, if a child wishes to develop an imaginary friend, the child is operable to talk to the AI and describe custom traits that the he or she wishes an imaginary friend to have. The AI then creates a character profile with the traits indicated by the child. The imaginary friend is thereby able to promote cognitive and social development in the child through interaction with the created character. Character profiles are operable to change instantly based on the child's input in order to match the speed at which a child's imagination progresses.

Similarly, authors are able to utilize the character profiles in order to develop a character for a story. By providing personality traits and examples of dialogue, the author is able to interact with the character he or she created in order to creatively explore potential ideas, concepts, and scenarios for the story.

Social Network Embodiment

The networking functions of the AI system provide for social interaction through personalities and profiles. For example, in one embodiment, the AI functions within a dating network, wherein a server is operable to allow uploading of a user profile and personality profile, including user preferences, correlated categories, voice, etc. Based on the personal information provided to the dating network, the system matches categories and personality traits of a first user profile to a second user profile. The system is then operable to allow users to share their personalities and/or user profiles automatically or manually between each other. Thus, when an AI loads the personality and/or user profile of the matched users, potential partners are able to interact and converse with the digital personality to test personal and/or sexual compatibility. In a further embodiment, AIs in network communication with each other are operable to communicate and log interactions without human intervention. In this embodiment, the profiles of a first user and a matched user are operable to communicate and interact without human intervention, wherein upon interaction, the AI generates a personality correlation value to measure compatibility between the two personalities and/or profiles. Interactions between the two profiles is based on interests, questions, values, and/or goals of each profile. The AI system is operable to provide records of responses to questions as well as interactions between the two personalities for user review. Records include transcripts, video files, audio files, or other digital records of interaction.

Education Embodiment

In educational embodiments, profiles and personalities of educators are operable to be shared through the AI system. In this instance, profiles and personalities further include a link to an external resource server, wherein the external resource server includes information related to a specific subject or lesson. When an educator personality and/or profile is loaded, the AI then serves to relay and teach information in a manner dictated by the educator personality and profile. Questions and conversations about the subject or lesson with the educator are further enabled by AI paired with the educator profiles and personalities.

Along with the educational embodiment, the AI system is operable to download, store, and enable customized learning modules. For example, in one embodiment, a module for teaching a foreign language is purchased through an online marketplace, whereupon the module is automatically downloaded by the device or manually imported by the user. Modules include logic that provide for either formal or informal training. For example, in a formal training scenario, the AI system presents questions to a user in the form of a quiz, such as "What is the capital of Italy?" The AI system is able to chart and track progress according to a set goal or lesson plan. Once a module is complete, a second module is downloaded that is a continuation of the formal training. In an informal training scenario, the AI system operates in normal interaction mode, but more preference is given to responses and interactions that promote learning of a specific subject. For example, a Spanish immersion module implementation results in the AI system responding to English-based user interactions with Spanish responses according to a fluency level stored in a user profile. Alternatively, the system is operable to receive an interaction in English, determine a fluency level of the user and a complexity of the language or syntax of the English interaction, and respond, "Good question. Try asking that again in Spanish."

Based on a lesson plan or goal, the AI system is further operable to retrieve customized content and display the content to the user. For example, the system is operable to access a database and determine that a podcast recorded in Spanish that meets a language complexity suitable for or equal to a user's current fluency or progress with a foreign language lesson plan. The system is operable to determine an appropriate podcast based on metadata associated with the podcast or based on processing of the audio file using AI and NLP. The podcast is then downloaded to the device and played.

Storybook Embodiment

The AI system is further operable to obtain, store, and read aloud pre-recorded text, audio, or combinations therein, such as a storybook. For example, the AI system is operable to download a voice file related to a specific story. A user is able to initiate a request by asking to hear the specific story. The AI system then begins to play the story and is operable to ask for input from the user in order to continue to a sequential section of the story or to navigate to a specific section of the book. Interactions are operable to change the story; for example, in one embodiment a story instructs the AI system to request a word or phrase from the user. This phrase is captured from the user and stored in the memory of the AI system and replayed at specific times within the story corresponding to the story programming and writing. In further embodiments, text of a story is downloaded from an external database or stored on the device, and a text-to-speech (TTS) engine converts the text into audio output. Thus, no audio recording is stored on the device, and the processing of the story text occurs only at the device level.

The storybook embodiment is further operable to be implemented with custom voice models. Voice models are obtained either through direct recordings from users or are developed through training a NLP model. For example, the AI system is able to graphically prompt a user, such as through an application on a computing device, or audibly, such as through a home speaker, to read lines of the book aloud. Each response is recorded and matched to a specific section, page, or set of words related to the story. Additionally, the platform is operable to develop a voice model for speech output based on verbal input from a user. For example, in one embodiment, a user records him or herself for one to five minutes, whereupon a voice model is created for any text-to-speech input. The AI system is operable to utilize the user voice model for any text output, for example to read a story book. Thus, the user does not need to record his or her voice for every storybook, but instead the voice model is applied to any text data that the AI converts to audio output.

In one embodiment, the AI system provides access to change settings through a graphical user interface (GUI). In a networked embodiment, a user is operable to access the GUI through an application or a web browser, and the settings are loaded from a memory or web server hosted on the AI. For example, in one embodiment the application is operable to connect to the AI system through a wireless connection (e.g., BLUETOOTH or WIFI) and load the settings and data from the server. Once loaded, the application is operable to change settings based on input from a user, for example to delete a user profile, enable a specific personality profile, restrict access to external databases, or purchase and transfer personality profiles to the system. In alternative embodiments, the AI system is operable to be connected to a control computer through physical communication methods, (e.g., Universal Serial Bus (USB), Serial, Coaxial).

In some instances, a user may wish to limit the content that is stored and/or retrieved in order to ensure privacy, implement parental controls, or focus the user's topics of conversation. Thus, the AI is operable to allow for control of each of these elements through the application or web server. In one embodiment, if an anti-storage option is enabled, raw data is collected, analyzed, and then deleted. This provides for the AI to develop according to interaction with the user but prevents recordings of a user's voice or other direct raw data from being stored on the system itself.

Furthermore, user profiles and personalities stored in the AI system are operable to be secured with biometrics to protect unwanted access to the profile and personality files. For example, upon loading a user's personality, the AI is operable to scan a user's facial features, ocular features, require the user to speak a password or security phrase, and/or require any other security measures known in the art of biometric security.

Data stored on the device or through the cloud-computing network is securely stored and distributed through SSL encryption as well as additional encryption and restriction through user access control. With encryption, each interaction stored on the AI system or uploaded through a computer network is preferably encrypted so as to prevent outside entities from accessing the information. Encryption, user account information (including user names, passwords, and preferences relating to the AI system) are operable to be setup through the online provisioning process or modified upon networking with the AI system.

In another embodiment, a toy, device, or other AI system includes a built-in or integrated display through which a GUI is displayed. The system is operable to receive inputs via a touchscreen built into the display, buttons or sliders on the device, or a microphone for verbal commands. The system is further operable to display information stored on the device or retrieved over a network connection, including settings, pictures, or video, and receive an input from a user, wherein the input, for example, changes a setting, edits a picture, or plays a video.

Referring now to the drawings in general, the illustrations are for the purpose of describing one or more preferred embodiments of the invention and are not intended to limit the invention thereto.

FIG. 1 illustrates one embodiment of the external source extraction and analysis of the present invention. In this embodiment, the external source is a book 101. The book is scanned and processed through an OCR engine 103 to convert text of the book to computer-readable characters. Following optical character recognition, the system utilizes NLP 105, a recommendation engine, and additional semantic analysis to recognize keywords, phrases, and ideas in the text. Keywords, phrases, and ideas are then extracted and stored in a database 107 and matched to a specific profile 109 in the database 107.

Figure 2:
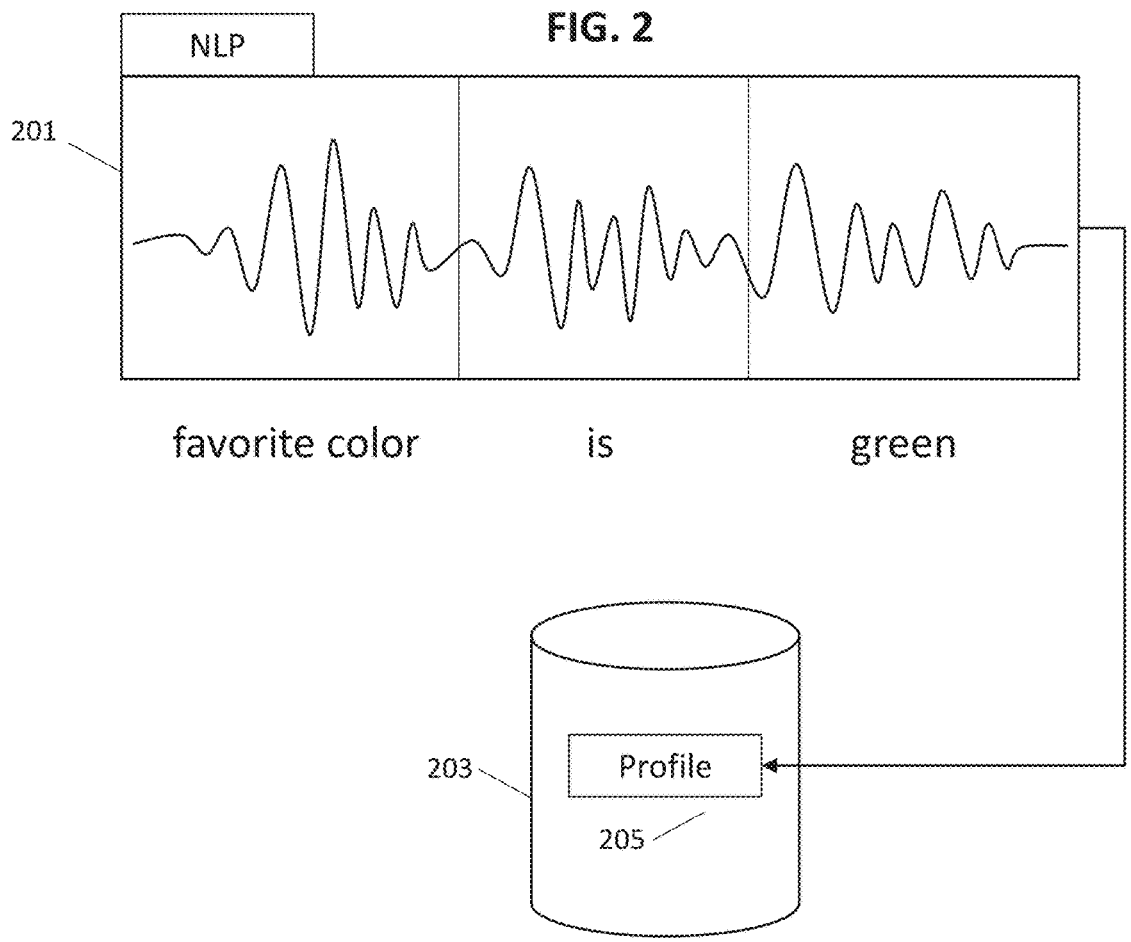
FIG. 2 illustrates one embodiment of the user interaction data extraction system of the present invention.

FIG. 2 illustrates one embodiment of the system collecting and storing raw interaction data. In this embodiment, audio 201 of a user indicating a favorite color, derived from a microphone or other sensor, is processed by the NLP engine 201. Each keyword, phrase, and idea is analyzed, tagged, and categorized. The extracted data is then stored in a database 203 and matched to a specific profile 205 in the database 203.

Figure 3:
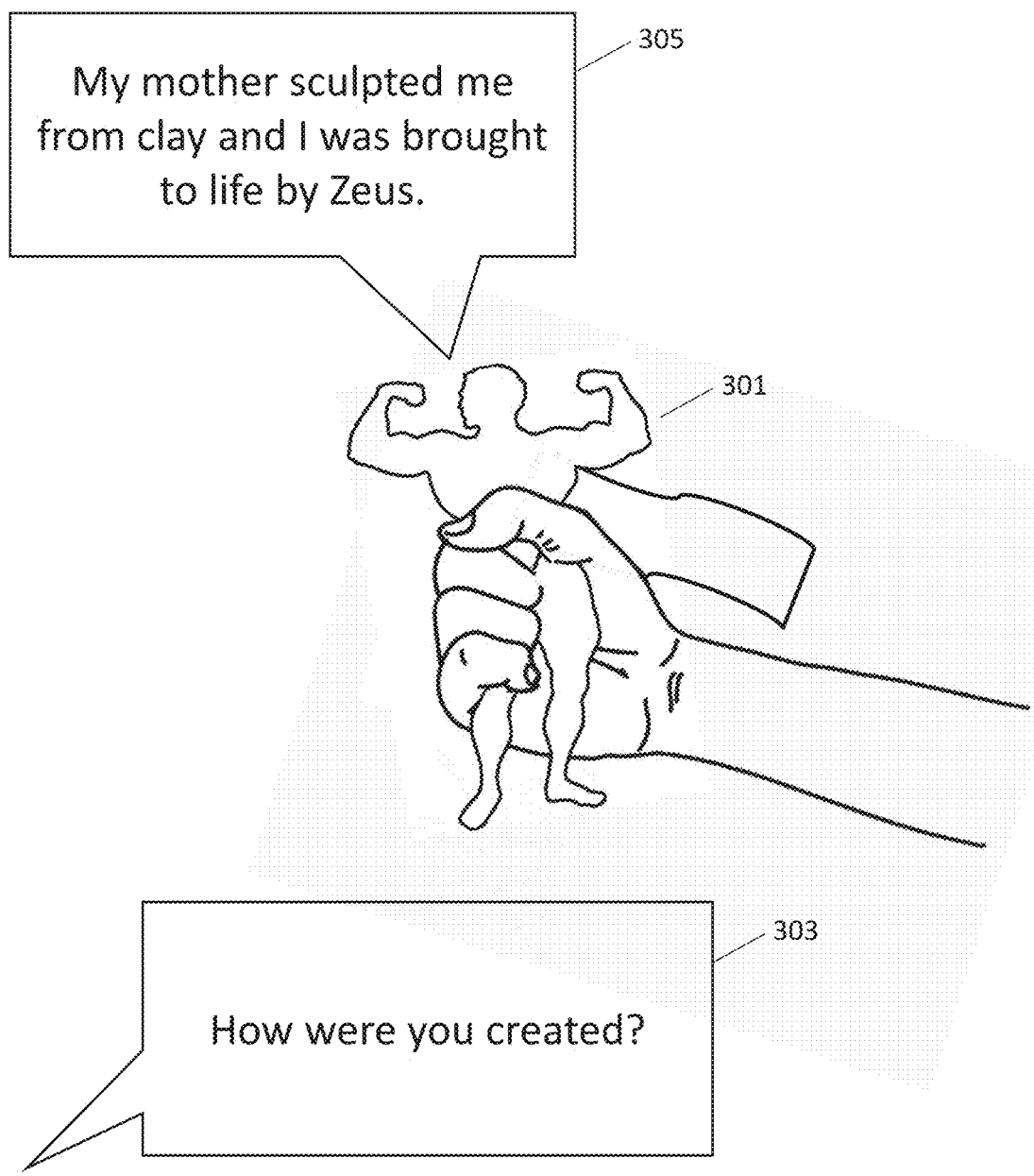
FIG. 3 illustrates one embodiment of human-AI interaction according to the present invention.

FIG. 3 illustrates one embodiment of an AI system embedded within a superhero action FIG. 301. The AI interacts with the user in a conversation. When the user provides an auditory stimulus 303, the superhero action FIG. 301 interprets the stimulus 303, compares the extracted keywords, meanings, and ideas of the stimulus 303 to personality data in a personality profile within the system memory. Responses are evaluated based on a correlation to the stimulus 303. The AI then selects the highest correlated response and plays the auditory response 305 for the user. The auditory response 305 in some embodiments is an audio file extracted from an external media source or in other embodiments is a generated response based on matched keywords, phrases, or ideas in a personality profile.

Figure 4:
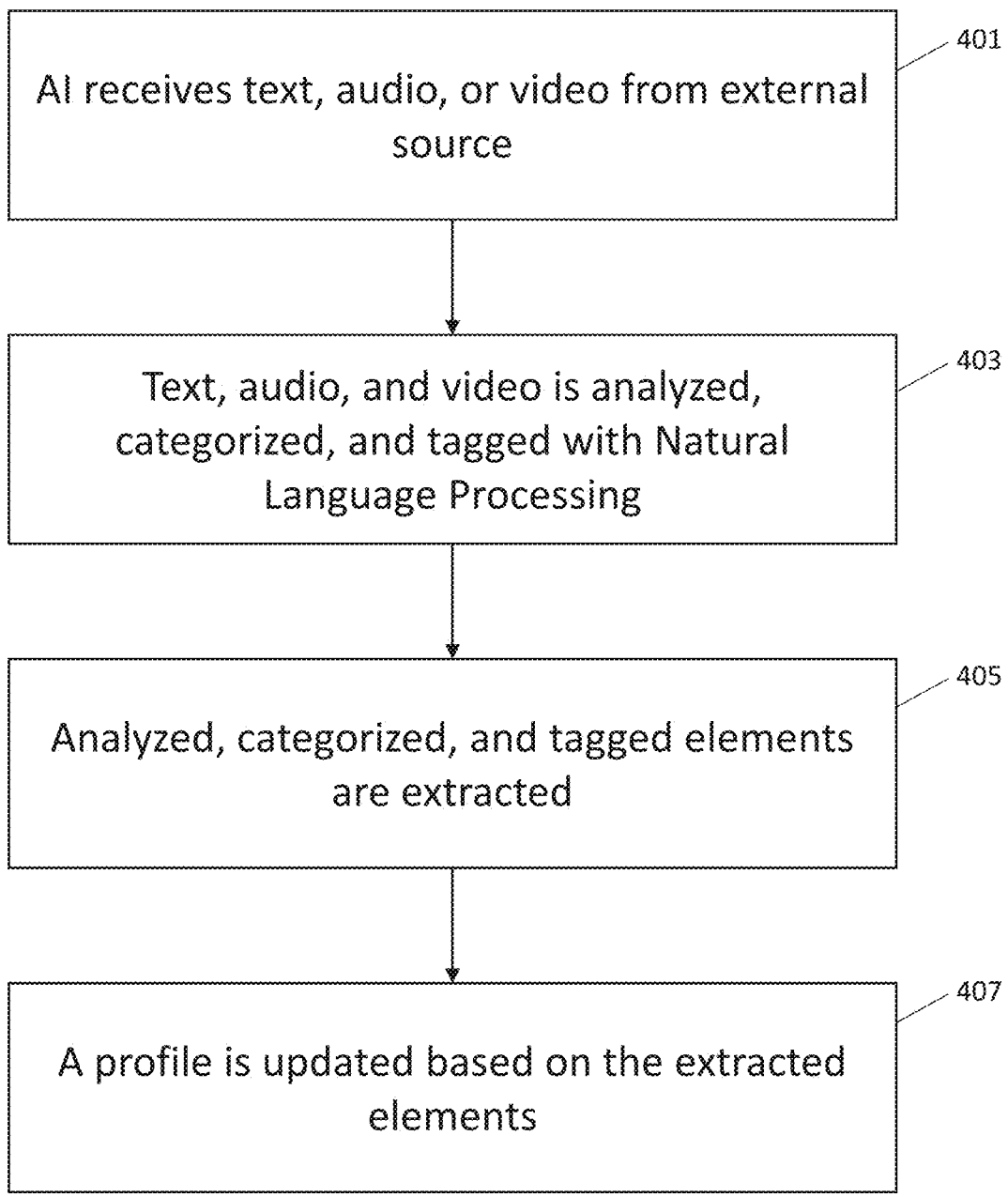
FIG. 4 is a flow chart illustrating one method of external source extraction according to the present invention.

FIG. 4 is a flow diagram illustrating one method of extracting external sources, as illustrated in FIG. 1. The AI system is operable to receive external from an external source 401, including text, audio, or video. Upon receiving the external media, it is then analyzed, categorized, and tagged with NLP 403. Based on the analyzed, categorized, and tagged media, the system extracts the text, audio, or video clips 405 and updates a profile based on the extracted elements 407.

Figure 5:
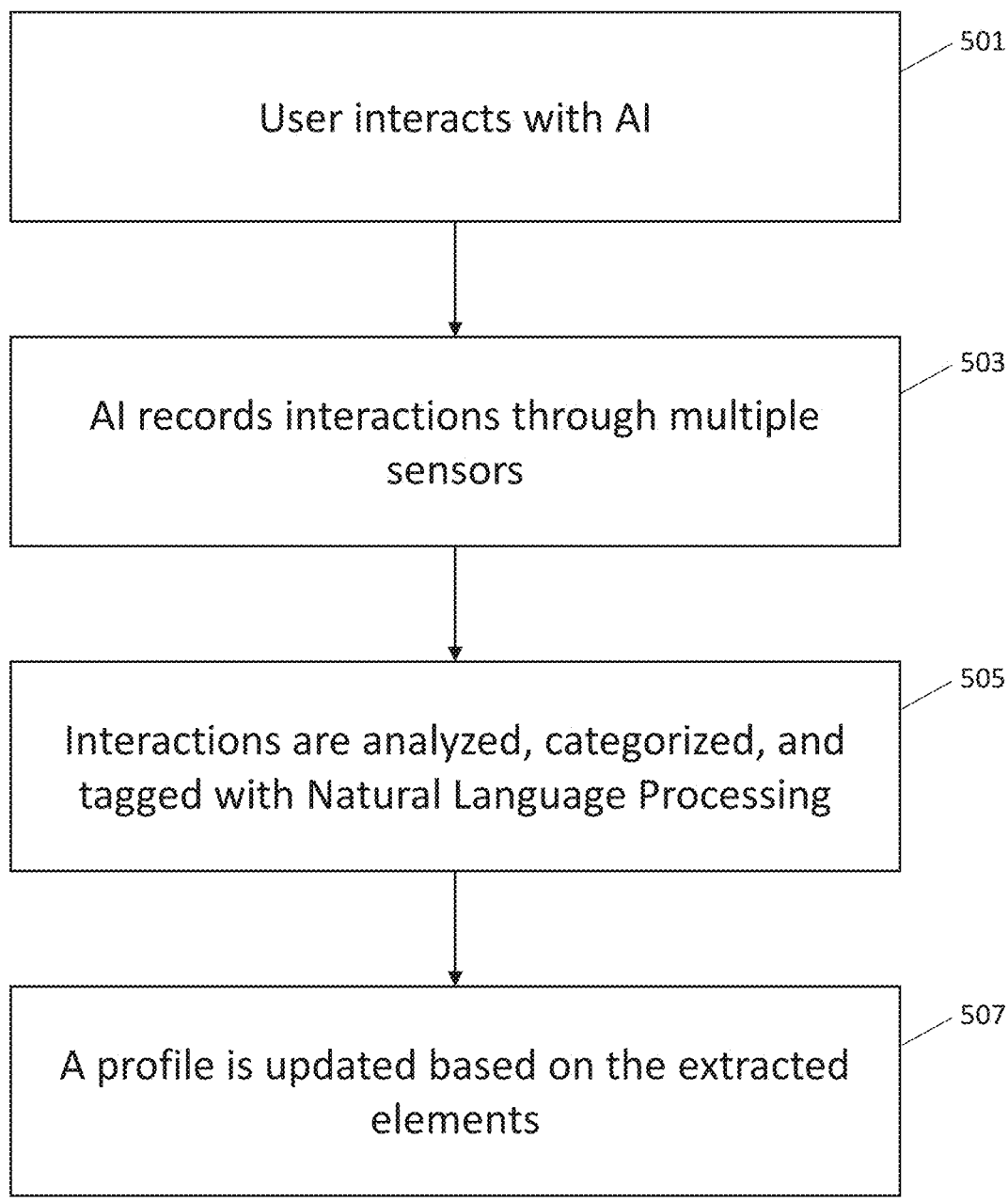
FIG. 5 is a flow chart illustrating one method of user interaction data extraction according to the present invention.

FIG. 5 is a flow diagram illustrating one method of collecting and processing interactions as illustrated in FIG. 2. A user interacts with the AI system 501 and during interaction the AI records the elements of interaction through its sensors 503. Elements of interaction include but are not limited to, speech, touch, and/or movement of the AI system. Other interaction may additionally include smell and/or taste. Each interaction is analyzed, categorized, and tagged with NLP 505 and recommendation as well as semantically analyzed to determine keywords, phrases, and ideas within the interaction and extract them. The extracted elements are then stored in a profile 507 for recall or further processing by the AI system.

Figure 6:
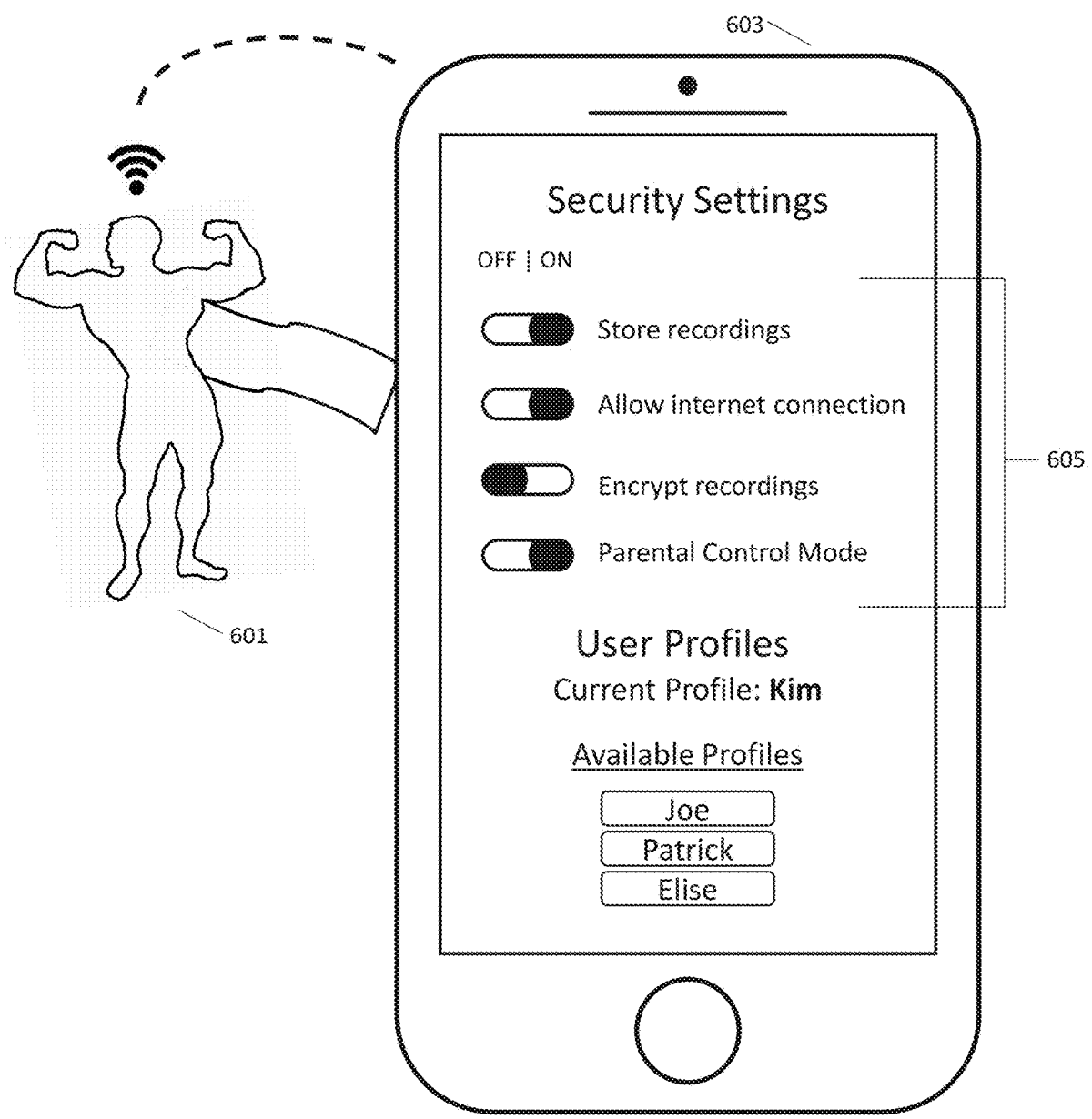
FIG. 6 illustrates one embodiment of the wireless capabilities and settings options of the present invention.

FIG. 6 illustrates one embodiment of the cloud networking control of the AI system. In the illustrated embodiment, the AI is embedded within an AI device 601, wherein the device is operable to connect to an external control computer 603 (e.g., a mobile phone as illustrated or a laptop, a desktop computer, or other computer with a GUI) through wireless technology. In one embodiment, the AI connects to the external control computer 603 through BLUETOOTH technology directly. In other embodiments, the AI instead connects to a wireless computer network through WIFI or similar technology and the external control computer 603 establishes a connection over the internet or over a local area network (LAN). Once connected, the AI system is operable to transmit the settings stored in the memory of the device, including security settings or user profiles. Graphical elements are either contained within an embedded application on the external control computer 603 or transmitted by the AI device 601 with the settings. Once a connection is established, settings transmitted by the AI device 601 are operable to be updated and synchronized with the device through indicator switches 605 or any other form of digital switch known in the art of user experience and user interface design. Furthermore, a profile selection is operable to be loaded onto the device through a selection by a user. In some embodiments, the profile is a user profile, such that multiple users can interact with the device and each user has customized, stored data. In another embodiment, the profile is a personality profile, such that a user can select a personality or personality traits to be exhibited by the AI device 601.

Figure 7:
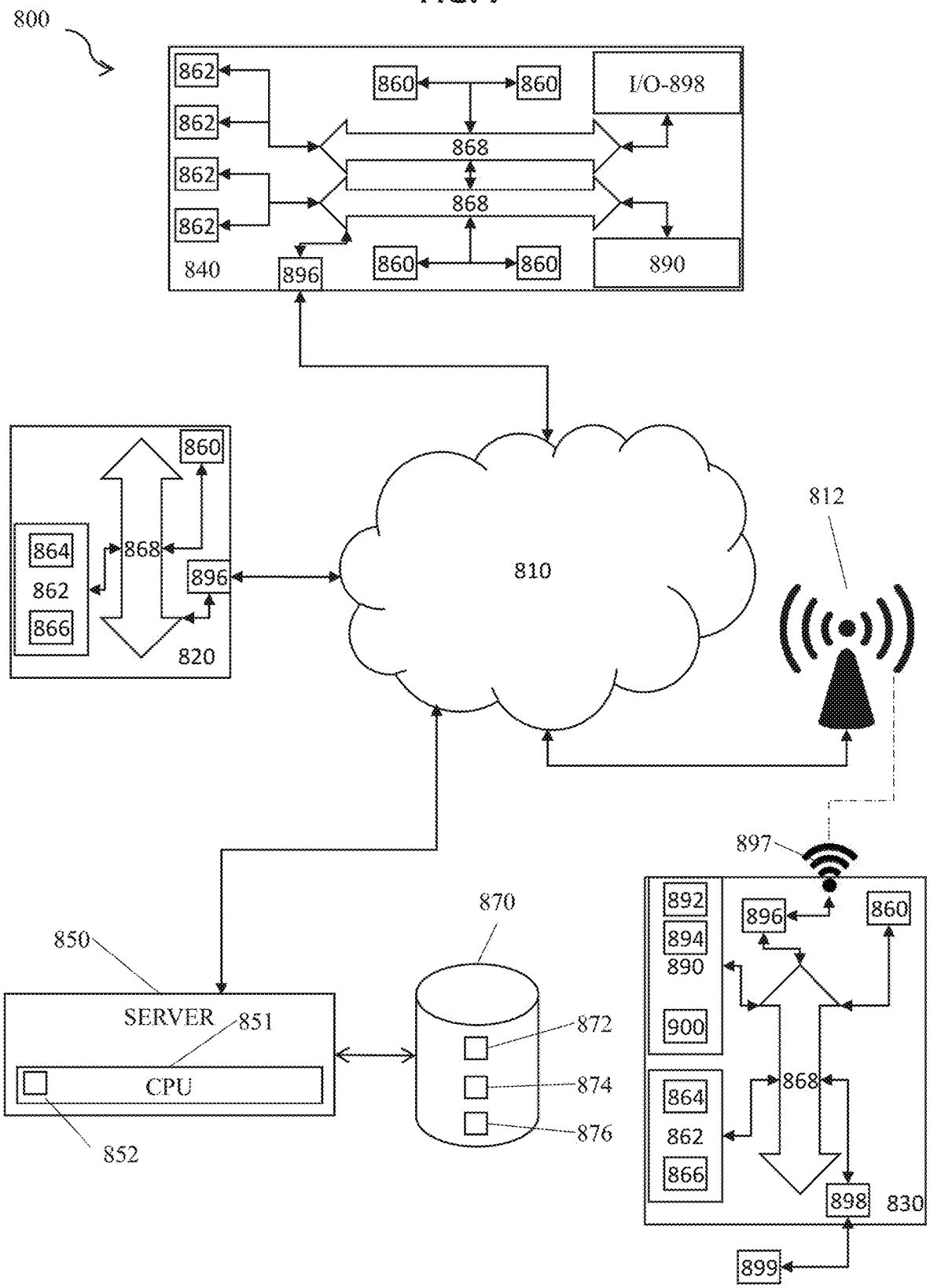
FIG. 7 is a schematic diagram of an embodiment of the invention illustrating a computer system.

FIG. 7 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by at least one mobile communication computing device 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 7, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

It is also contemplated that the computer system 800 may not include all of the components shown in FIG. 7, may include other components that are not explicitly shown in FIG. 7, or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Wireless communication protocols utilized by the AI system include any wireless method known in the art (e.g., LTE, 3G, 1 GBps, VPN, IPSec, ModBus, DNP3, kWp, KYZ, JDBC, REST, WiFi, Zigbee, SEP, PLC, BLE). Notably, the wireless functionality of the device and the transmission of user profiles, personality profiles, and other information between the AI system and other computing devices ties the invention inextricably to a the technical field of artificial intelligence and computer networking, as the invention would not have been possible before these developments.

Figure 8:
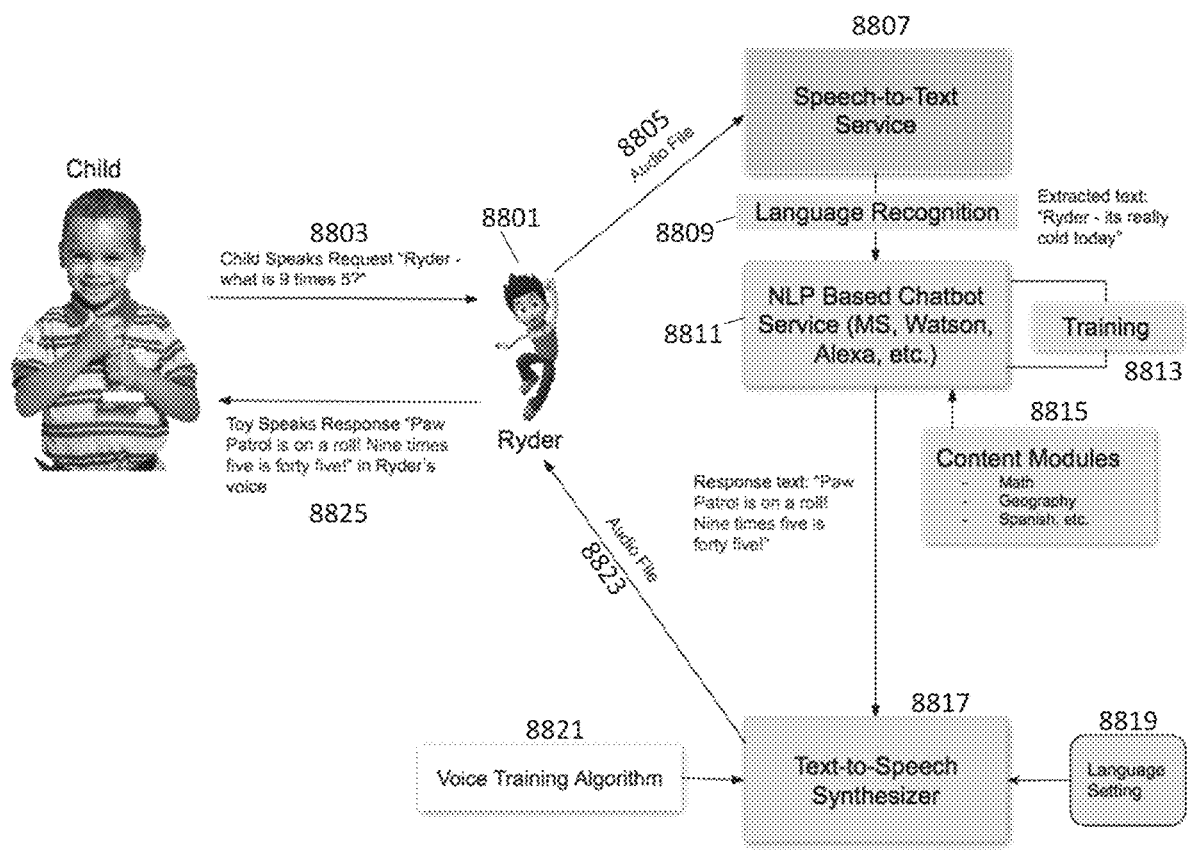
FIG. 8 is a flow chart illustrating one embodiment of speech processing according to the present invention.

FIG. 8 illustrates another embodiment of a doll embodiment of the present invention, wherein a toy 8801 is operable to receive an input 8803. The input is recorded by the toy 8801 and stored as an audio file 8805 in a memory of the toy 8801. The audio file 8805 is processed through a speech-to-text (STT) service 8807, which is either stored locally on the toy 8801 or is stored on an external server. The STT service uses language recognition tools 8809 in order to extract text from the audio file 8805 and determine which language the input audio file was recorded in. Text output from the STT service 8807 is processed through a natural language processing (NLP) chatbot service 8811, which is either stored internally on the toy 8801 or an external server. The chatbot service 8811 determines meaning from the text output from the STT service 8807, for example whether the input is a question or a statement, and determines an appropriate answer to the input. Training modules 8813 continuously modify the determined best responses based on previous user interaction, updated user profiles, updated personality profiles, and external data. Preferably, the training modules 8813 are based on user profiles, personality profiles, external data sources, or interaction data stored in a memory and database in network communication (locally or over the Internet) with the chatbot service 8811. Content modules 8815 are preferably applied to the chatbot service 8811, wherein answers to questions or appropriate teaching responses are selected for response. For example, if a geography content module 8815 is enabled with the chatbot service 8811, an input of "Charlotte is the capital of North Carolina," in one embodiment would invoke a response of "No, that's not correct. Try again." Whereas if the geography module 8815 is not enabled, the response in another embodiment would be, "Actually, the capital of North Carolina is Raleigh." The geography module 8815 thus manipulates responses according to a specific lesson plan or learning objective and determines appropriate responses based on module and personal information stored in a user profile. Lastly, a text-to-speech synthesizer 8817 internal or external to the toy 8801 receives a text output from the chatbot service 8811 and converts the text into artificial speech output. A voice training algorithm 8821 applies a voice model to the text-to-speech (TTS) synthesizer 8817, such as a pre-trained custom voice from a user or a third-party voice corresponding to a commercial character. A language setting 8819 is communicated from the chatbot service 8811, the toy 8801, or a server associated with a user profile and/or the toy. The language setting 8819 indicates an appropriate language by which the TTS synthesizer 8817 should convert the output of the chatbot service 8811 into a response audio file 8823. The response audio file 8823 is passed back to the toy 8801, which plays the response audio file 8823 as a response 8825 through embedded or external speakers. This diagram is one embodiment of the toy diagram, and several modifications are eliminated herein for sake of conciseness. For example, the chatbot 8811 in one embodiment indicates a non-audio file response, such as a gesture or movement for the toy 8801. In another embodiment, the chatbot service does not simply answer questions but instead is operable to create conversation by receiving verbal input from a user, creating a response, receiving a second input from the user, and creating a second response, wherein the second response is based on the verbal input, the created response, and the second input.

Figure 9:
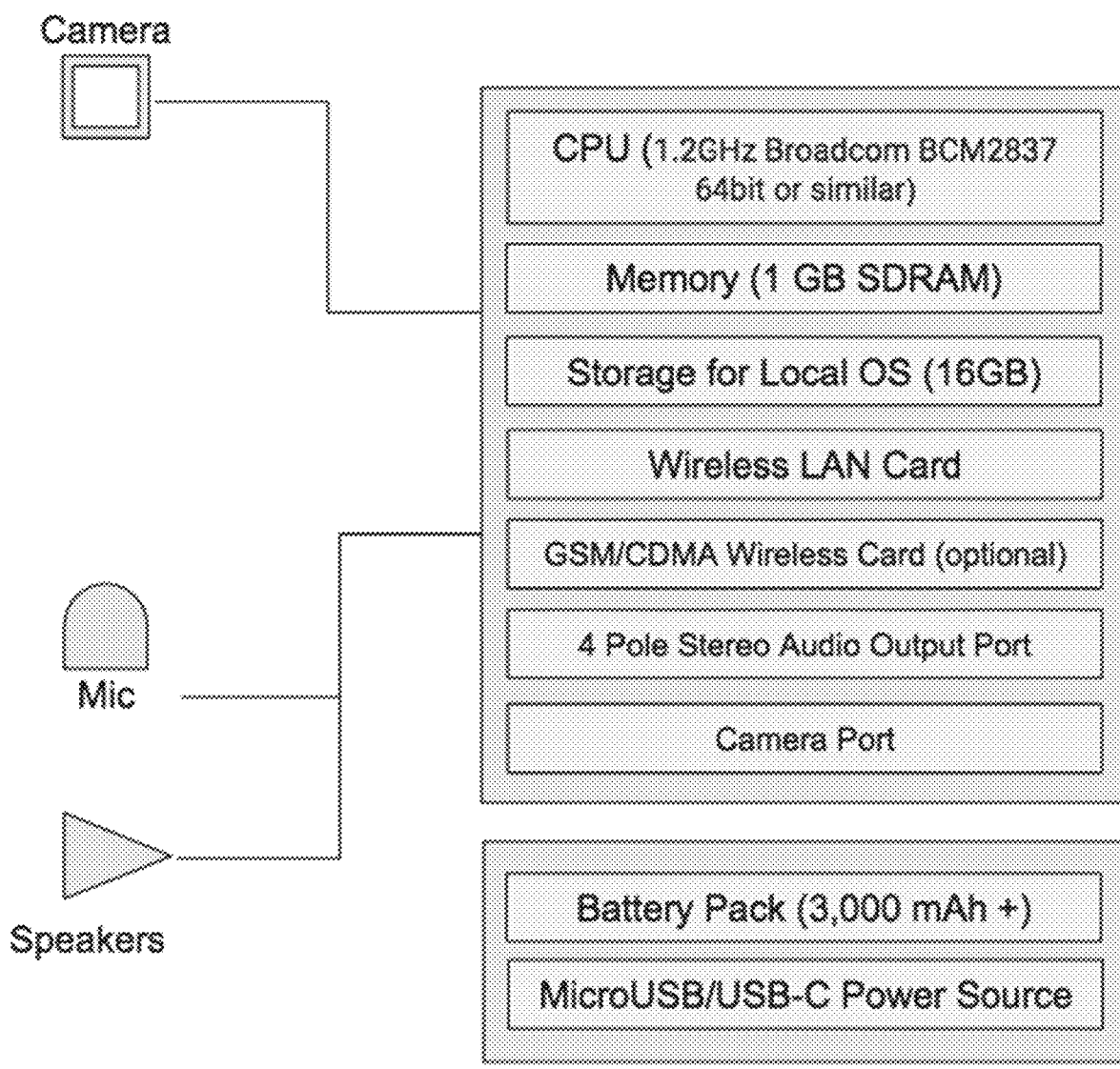
FIG. 9 is a system schematic illustrating one embodiment of a hardware implementation of the present invention.

FIG. 9 illustrates one embodiment of the present invention, wherein a camera, microphone, and speakers are operably connected to a computer device with a processor, memory, wireless network capabilities, and a power source. Preferably, the computer device is mobile, for example, a smartphone or toy.

Figure 10:
FIG. 10 is an application graphical user interface (GUI) illustrating one storybook embodiment with voice selection according to the present invention.

FIGS. 10, 11, 12, 13, 14, 15, 16, 17, and 18 illustrate mobile application-based storybook embodiments of the present invention. FIG. 10 illustrates a story and reader selection. The application is operable to receive an input selecting a story 1001 and a reader 1003. Each story 1001 is either stored on the device or is downloadable from an external server. Each voice model 1003 is either a pre-recorded version of each story 1001 or is a voice model that was developed to read any text or story. The application is further operable to display only readers available for a specific story when the story is selected. For example, a selection of a first story only displays "Daddy" as an available pre-recorded version of the story and "Mommy" as an available text-to-speech voice, whereas a selection of a second story displays only "Mommy" as an available text-to-speech voice.

Figure 11:
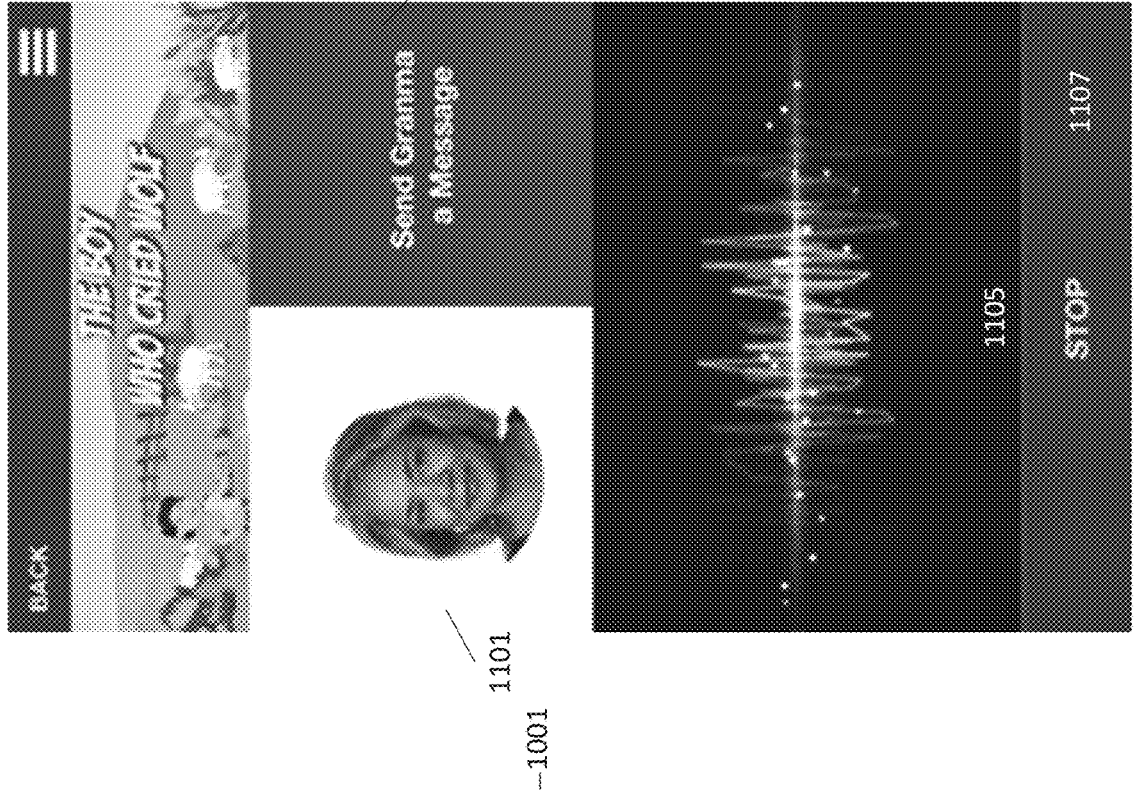
FIG. 11 is an application GUI illustrating one storybook embodiment with voice playback according to the present invention.

FIG. 11 illustrates one embodiment of a story playback screen, wherein upon selecting a story and reader from the story and reader screen, the application displays a picture of the selected reader 1101 and a waveform of the audio playback 1105. A messaging system is operable to determine a contact protocol (e.g., instant message, email, or phone number) that is stored in a user profile or stored contact information of the selected voice 1101 and display a message button 1103. The message button 1103 links to an appropriate messaging service, such as an external messaging application, or provides an input screen (not shown), wherein a user is operable to construct and send a message including text, picture, video, or audio, which is then forwarded by the application to a messaging service in network communication with the application. A stop button 1107 is operable to stop the story from playing. In one embodiment, the stop button changes to a play button when pressed. Further controls, including stop, rewind, seek, skip, or time jump are operable to be implemented in the application through buttons, scroll bars, seek bars, or any other control mechanism known in the software arts for audio playback.

Figure 12:
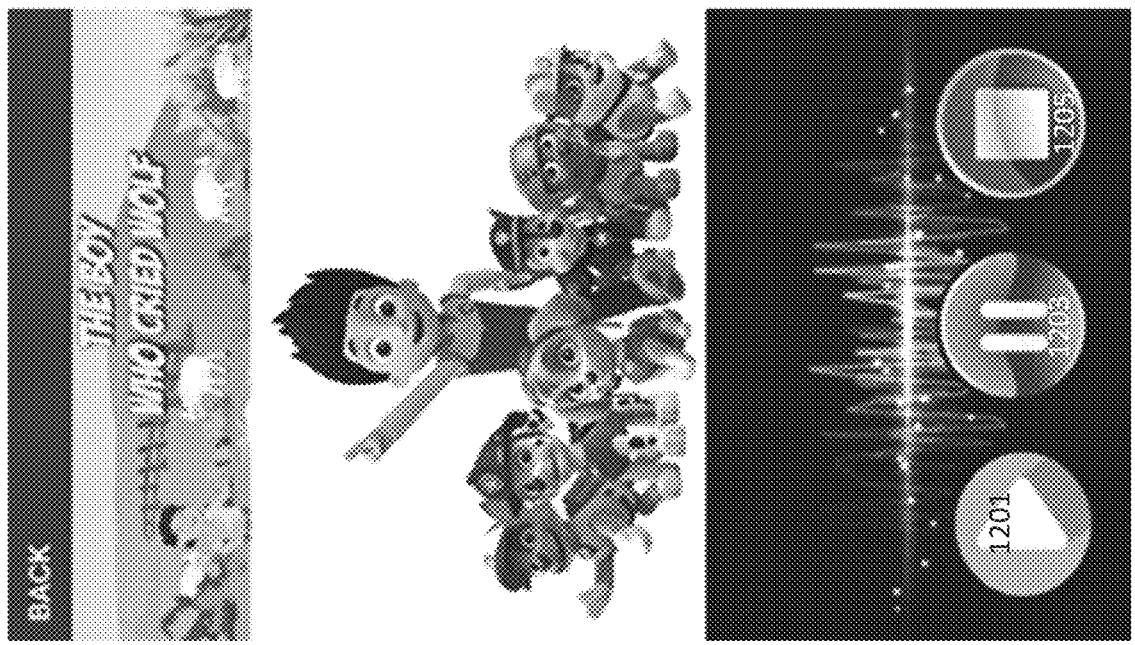
FIG. 12 is an application GUI illustrating one storybook embodiment with alternative voice playback according to the present invention.

FIG. 12 illustrates one embodiment of a commercial voice storybook implementation of the present invention. Instead of a pre-recorded voice or a voice model that is attached to a user profile, the present invention further allows for recordings and voice models to be obtained from external services. For example, an external service is operable to host a voice which is a branded voice from a popular TV personality. The application is operable to request the branded storybook recording or voice model and playback a selected storybook with the branded recording or voice model. A play button 1201, pause button 1203, or stop button 1205 are configured to control playback of the storybook output.

FIG. 13 illustrates a voice management system for the storybook embodiment of the present invention. Notably, in another embodiment, the voice management system is applied to a voice model training or interaction response development tool for response outside of a storybook embodiment, for example with a smart home speaker or a toy/doll. The voice management system displays recorded voices for each story or universal, trained voice models. FIG. 13 depicts a recorded voice, "Daddy" 1301, with corresponding picture and name. Buttons allow a user to initiate playback a sample of the recording or a sample of the voice model by clicking, tapping, or otherwise digitally interacting with the "LISTEN TO A SAMPLE" button 1303. A delete button 1305 allows a user to use the system to remove the voice recording or voice model from the system. Adding a new voice via selecting the "Add a New Voice" button 1307 directs a user to a new interface for training or recording voice for the system.

FIG. 14 illustrates a voice training system for adding a new voice. The training system is operable to receive and display a picture 1401 which indicates a person corresponding to the reading. Several prompts 1403 are displayed during the training process. Users record themselves speaking the voice samples by clicking the record button 1405, which becomes a stop record button during the recording process. Recordings are temporarily stored on a memory of the device on which the application is installed. A play button 1407 plays the stored recording, and a remove button 1409 deletes the stored recording. Interacting with the submit button initiates a process wherein the recorded files are stored long-term on the device until removal or are synchronized to an online memory and database. Each recording file is associated with a specific user profile or identifying information input by the user through the voice management or voice recording tools at time of creation.

Figure 16:
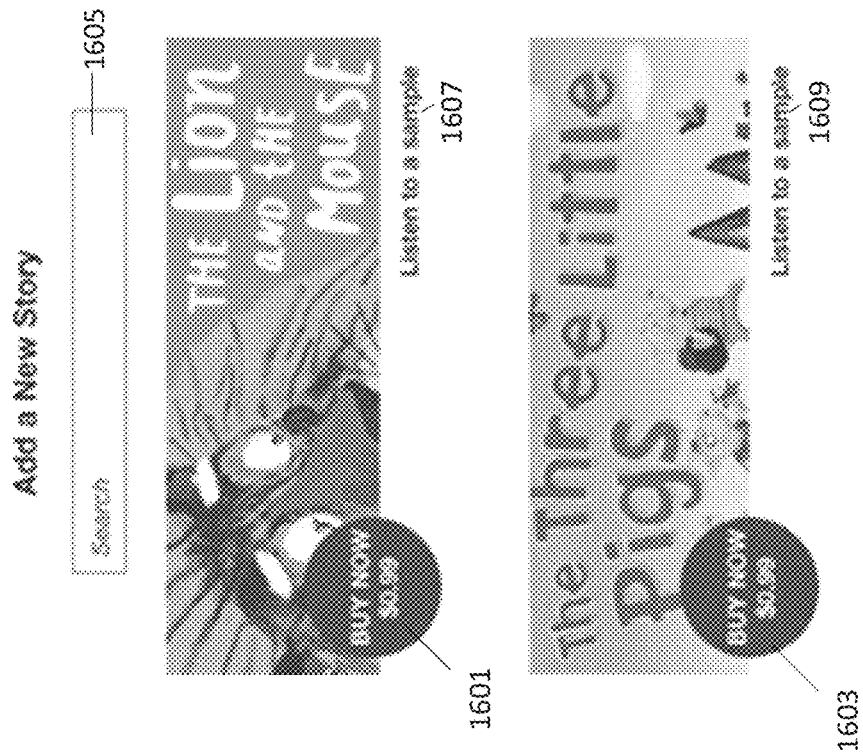
FIG. 16 is an application GUI illustrating one storybook embodiment with story purchasing according to the present invention.
Figure 15:
FIG. 15 is an application GUI illustrating one storybook embodiment with story selection according to the present invention.
Figure 17:
FIG. 17 is an application GUI illustrating one storybook embodiment with a purchased story selection according to the present invention.

FIGS. 15, 16, 17, and 18 illustrate an ecommerce embodiment of the present invention, wherein the application is operable to search for, download, store, and play stories from an external database. FIG. 15 illustrates a story selection screen, wherein upon receiving a selection input of a story, the application is operable to begin story playback. An "Add a New Story" button 1501 directs users to a story purchase screen, to add and purchase new stories. FIG. 16 illustrates the story purchase screen, which displays stories that are available for purchase and download. The application is, in one embodiment, in network communication with a server with memory and a database, wherein the server with memory and database includes listings of story files available for download. The application is operable to query and receive an indication of the story listings and display the queries in a GUI. A search box 1605 is operable to receive a search term for a title, summary, author, or other identifying feature for a story and display results in the application GUI. A search terms either is processed locally to filter on device storybooks based on the search term, or the search term is transmitted to an external server, which matches the search term to available storybooks and returns the matched storybooks to the application. Upon clicking a purchase button 1601, 1603, the application sends an indication of the purchase to the server and requests the corresponding story files. The application is further operable to be in network communication with an additional server storing user profiles and is operable to send an indication of the purchase to the additional server, wherein the indication of the purchase is stored with the user profile. Selecting one of the download buttons 1601, 1603 in one embodiment directs users to a purchase page, wherein the page is operable to receive and transmit purchase information (e.g., name, address, credit card information) prior to purchasing the storybook. A sample story book button 1607, 1609 further allows a user to listen to a sample selection of the story either on the application or through an external device. The sample is played either by processing text through a custom voice model or through playing sample pre-recorded audio file. Once a story is purchased, the story is added to a local database or synchronized to an online database, wherein the story selection screen reads the local database or online database and lists each corresponding story available for playback. FIG. 17 illustrates a story selection screen with a purchased story 1701 from FIG. 16.

Figure 18:
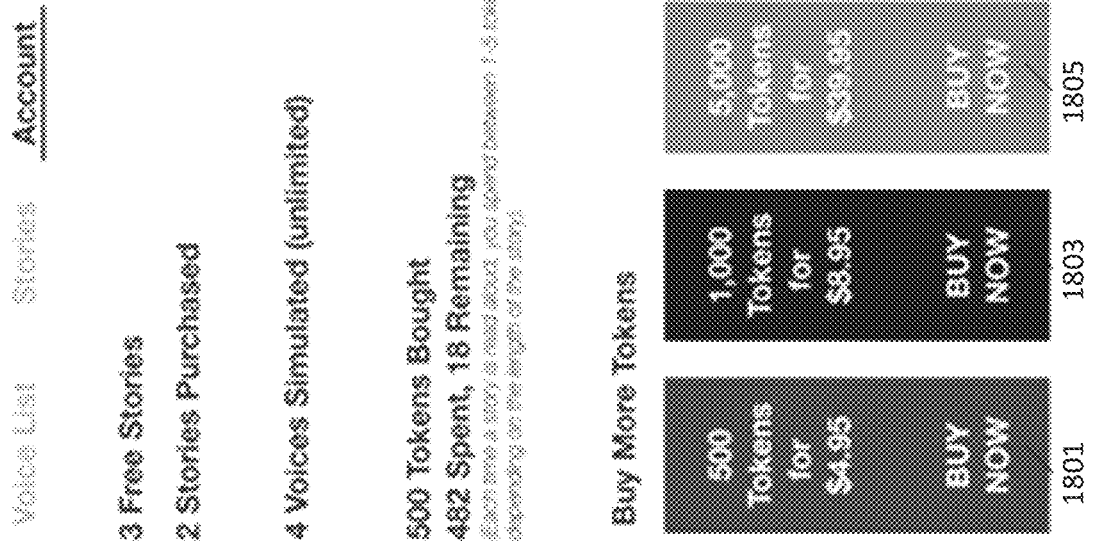
FIG. 18 is an application GUI illustrating one storybook embodiment with a token purchase feature according to the present invention.

FIG. 18 illustrates an account management embodiment of the ecommerce platform for storybooks. A user interface (UI) of the application is operable to display token purchase buttons 1801, 1803, 1805, wherein interaction with each of the token purchase buttons 1801, 1803, 1805 directs the application to a purchase page for the tokens, and wherein the token purchase method is similar to the storybook purchase process illustrated in FIGS. 15, 16, and 17. In one embodiment, once an indication of tokens is added to an external or internal database, purchases of storybooks only result in a subtraction of a token count from a user profile or cache and does not require input of further payment information.

A further embodiment implements each of the storybook features and AI/learning profiles into a toy or doll. A connected device, such as a smartphone, laptop, or other computing device is constructed to display an application with management features for settings, storybook, personality, or other modules for the toy or doll. For example, an application is operable to purchase and load a storybook through the application as illustrated in FIGS. 15, 16, and 17 and transmit the necessary audio files to the toy or doll for playback upon request of a user. Furthermore, the doll or toy is operable to develop a voice model or storybook recording through recording user interaction with the device and applying the voice model to a story. The voice model or storybook recording is recorded and developed based on prompts answered by a user or through normal interaction with the toy. Once a voice model or storybook recording is developed, an indication of an available voice model appears on the application storybook selection screen. Processing and building the voice model or storybook recording from audio clips is accomplished on the connected computing device or at the toy or doll device.

The AI device is, in one embodiment, constructed from a variety of materials, including solid crystal, liquid crystal, plastic, or metal, and is operable to utilize color changing technology and liquid crystal materials in order to actively or passively change a color of the device. Additionally, the structure and materials contribute to ensure the device is water resistant and sealed from liquid intrusion. In one embodiment, the device is constructed to withstand water intrusion while submerged up to 25 feet (7.62 meters) for up to 30 minutes. In another embodiment, the device is constructed to withstand water intrusion while submerged up to 5 feet (1.542 meters) for up to 30 minutes. In further embodiments, the device is operable to include a photo printer within the device and print hard copies of digital photos taken and stored in a memory on the device. In an alternative embodiment, the device is constructed with a removable face or hinged door, wherein an inside of the device is constructed with a compartment for storage. The device, in another embodiment, comprises a projector, wherein images are projected according to a determined virtual assistant response, and wherein the images are tailored to a set goal or lesson plan.

The above-mentioned examples are provided to serve the purpose of clarifying the aspects of the invention, and it will be apparent to one skilled in the art that they do not serve to limit the scope of the invention. By way of example, the AI-embedded device in some embodiments is a stand-alone speaker. In other embodiments, it is embedded within an application on a mobile device. The above-mentioned examples are just some of the many configurations that the mentioned components can take on. All modifications and improvements have been deleted herein for the sake of conciseness and readability but are properly within the scope of the present invention.

What it claimed is:

1. An artificial intelligence (AI) system for improved avatar development and artificial personality implementation, comprising:
    a device including a local processor, a local memory with a local database, and a graphical user interface (GUI);
    a virtual assistant (VA) service hosted on at least one server, wherein the VA service includes at least one processor and at least one memory with at least one database;
    wherein the device is connected to the at least one server via wireless network connection and is configured to access the VA service and transmit information to the at least one server;
    wherein the device receives a user profile including a user personality and at least one user characteristic and transmits the user profile to the at least one server;
    wherein the at least one server stores the user profile in the at least one memory;
    wherein the VA service constructs a user avatar from the user profile, wherein the user avatar embodies the user personality and an appearance of the at least one user characteristic;
    wherein the device receives at least one artificial profile including at least one artificial personality, wherein the device further receives a selection of at least one artificial personality trait and/or at least one artificial characteristic via the GUI of the device;
    wherein the VA service is operable to modify parameters of the at least one artificial personality trait to follow at least one lesson plan or at least one user goal;
    wherein the VA service constructs at least one artificial avatar for the at least one artificial profile, wherein the at least one artificial avatar embodies the at least one artificial personality, including the at least one artificial personality trait, and an appearance of the at least one artificial characteristic;
    wherein the VA service is further operable to determine a physical appearance of the user avatar based on characteristics and/or personality traits selected by a user via the GUI;
    wherein the VA service displays the user avatar and the at least one artificial avatar to the GUI of the device;
    wherein the at least one artificial avatar is automated and interacts with the user avatar in a manner dictated by the at least one artificial personality of the at least one artificial avatar; and
    wherein the VA service is operable to extract and correlate meanings, emotions, and ideas from an input, wherein the input is transmitted from the device, analyzed using a natural language processing (NLP) engine, and matched to a predetermined semantic category.

2. The system of claim 1, wherein the VA service is operable to load extracted data from an external database relative to the predetermined semantic category and construct a response based on the extracted data.

3. The system of claim 1, wherein the user profile includes a rule set for interacting with at least one semantic category, wherein the rule set is implemented by the VA service.

4. The system of claim 1, wherein the VA service displays the at least one artificial avatar and the user avatar in an Augmented Reality (AR) platform, a Virtual Reality (VR) platform, or a gaming platform.

5. The system of claim 1, wherein the VA service combines a first artificial personality of a plurality of artificial personalities with at least one additional personality to create a merged personality.

6. The system of claim 1, wherein the at least one artificial personality trait is selected from a list of personality categories displayed on the device.

7. The system of claim 1, wherein the user personality is further developed by the VA service through interaction data from the device.

8. The system of claim 1, wherein the user avatar and/or the at least one artificial avatar is transmitted to a holographic display, wherein the VA service is operable to access interaction data relating to actions and facial and body movements to generate a hologram.

9. The system of claim 1, wherein the VA service is operable to receive a content module from the device, wherein the content module includes an educator personality, at least one educational goal, and the at least one lesson plan.

10. The system of claim 9, wherein the VA service is operable to access, analyze, and suggest a podcast, television show, movie, book and/or audiobook from at least one external database that relates to the at least one lesson plan.

11. An artificial intelligence (AI) system for improved avatar development and artificial personality implementation, comprising:
    a platform hosted on a server, wherein the server includes at least one processor and at least one memory with at least one database;
    a Virtual Assistant (VA) service hosted on the platform;
    a device including a local processor and a local memory with a local database;

wherein the device is connected to the server via wireless network connection and is configured to access the platform and transmit information to the server;
wherein the platform is configured to construct a user account, wherein the user account includes user data including at least one personality trait and at least one user characteristic;
wherein the platform is configured to store the user account on the at least one memory of the server;
wherein the VA service is configured to develop a user personality embodying the at least one personality trait of a user;
wherein the VA service is further configured to construct a plurality of artificial personalities, wherein the platform receives at least one user-selected attribute for each of the plurality of artificial personalities;
wherein the VA service combines a first personality of the plurality of artificial personalities with at least one additional personality of the plurality of artificial personalities to create a merged personality, wherein the at least one additional personality includes at least one alternative characteristic;
wherein the VA service constructs a user avatar which embodies the user personality and an appearance of the at least one user characteristic;
wherein the VA service constructs a merged avatar which embodies the merged personality and the appearance of the at least one user characteristic and the at least one alternative characteristic;
wherein the VA service constructs a plurality of artificial avatars which each embody one of the plurality of artificial personalities;
wherein the VA service displays the user avatar, the merged avatar, and the plurality of artificial avatars on the platform; and
wherein the user avatar, the merged avatar, and the plurality of artificial avatars are stored on the user account of the platform;
wherein the VA service is operable to access, analyze, and suggest a podcast, television show, movie, book and/or audiobook from at least one external database that relates to at least one lesson plan;
wherein the VA service is operable to modify parameters of at least one artificial personality trait to follow the at least one lesson plan or at least one user goal;
wherein the VA service is further operable to determine a physical appearance of the user avatar based on characteristics and/or personality traits selected by the user via a graphical user interface (GUI); and
wherein the VA service is operable to extract and correlate meanings, emotions, and ideas from an input, wherein the input is transmitted from the device, analyzed using a natural language processing (NLP) engine, and matched to a predetermined semantic category.

12. The system of claim 11, wherein the user avatar, the merged avatar, and/or the plurality of artificial avatars are transmitted to a holographic display, wherein the VA service is operable to access interaction data relating to actions and facial and body movements to generate a hologram.

13. The system of claim 11, wherein the platform is an Augmented Reality (AR) platform, a Virtual Reality (VR) platform, or a gaming platform.

14. The system of claim 11, wherein the user avatar, the merged avatar, and the plurality of artificial avatars are automated by the VA service, wherein the user avatar interacts in a manner dictated by the user personality, wherein the merged avatar interacts in a manner dictated by the merged personality, and wherein each of the plurality of artificial avatars interact in a manner dictated by a corresponding artificial personality of the plurality of artificial personalities.

15. The system of claim 11, wherein the user personality is further developed by the VA service through interaction data from the device.

16. The system of claim 11, wherein the user avatar, the merged avatar, and the plurality of artificial avatars are selectively enabled and disabled via the device.

17. An artificial intelligence (AI) system for improved avatar development and artificial personality implementation, comprising:
a device including a local processor and a local memory with a local database;
a virtual assistant (VA) service hosted on a platform, wherein the platform is hosted on at least one server, wherein the VA service includes at least one processor and at least one memory with at least one database;
wherein the device is connected to the at least one server via wireless network connection and is configured to access the VA service and transmit information to the at least one server;
wherein the device constructs a user account and receives a user profile including a user personality and at least one user characteristic associated with the user account;
wherein the device transmits the user account to the at least one server, wherein the at least one server stores the user account in the at least one memory;
wherein the VA service constructs a user avatar from the user profile, wherein the user avatar embodies the user personality and an appearance of the at least one user characteristic;
wherein the VA service loads the user profile onto the device based upon a determination that a user associated with the user profile is using the device via facial recognition of the user;
wherein the VA service is configured to construct a plurality of artificial personalities, wherein the platform receives at least one user-selected attribute for each of the plurality of artificial personalities;
wherein the VA service constructs a plurality of artificial avatars which each embody one of the plurality of artificial personalities;
wherein the VA service displays the plurality of artificial avatars on the platform;
wherein at least one preconstructed artificial personality and at least one preconstructed avatar embodying the at least one preconstructed artificial personality are purchased via connection to at least one external entity and downloaded to the at least one database;
wherein the VA service is operable to extract and correlate meanings, emotions, and ideas from an input, wherein the input is transmitted from the device, analyzed using a natural language processing (NLP) engine, and matched to a predetermined semantic category;
wherein the VA service displays the user avatar, the preconstructed avatar, and the plurality of artificial avatars on the platform;
wherein the user avatar, the preconstructed avatar, and the plurality of artificial avatars are automated by the VA service;
wherein the user avatar interacts in a manner dictated by the user personality, wherein the preconstructed avatar interacts in a manner dictated by the at least one preconstructed artificial personality, and wherein each of the plurality of artificial avatars interact in a manner dictated by a corresponding artificial personality of the plurality of artificial personalities;

wherein the user avatar, the preconstructed avatar, and the plurality of artificial avatars are stored in the user account of the platform;

wherein the VA service is operable to access, analyze, and suggest a podcast, television show, movie, book and/or audiobook from at least one external database that relates to at least one lesson plan; and wherein the VA service is operable to modify parameters of at least one artificial personality trait to follow the at least one lesson plan or at least one user goal.

18. The system of claim 17, wherein the platform is an Augmented Reality (AR) platform, a Virtual Reality (VR) platform, or a gaming platform.

19. The system of claim 17, wherein the at least one preconstructed artificial personality displayed by the at least one preconstructed avatar includes an audio clip reciting a fact, quote, a story, or catchphrase.

20. The system of claim 17, wherein the VA service combines a first personality with at least one additional personality to create a merged personality, wherein the first personality is one of the plurality of artificial personalities or the at least one preconstructed artificial personality, wherein the at least one additional personality is one of the plurality of artificial personalities or the at least one preconstructed artificial personality.

21. The system of claim 17, wherein the VA service includes a content module, wherein the content module includes an educator personality, at least one educational goal, and the at least one lesson plan.

22. The system of claim 21, wherein the VA service is operable to access, analyze, and suggest a podcast, television show, movie, book and/or audiobook from the at least one external database that relates to the at least one lesson plan.

23. An artificial intelligence (AI) system for improved avatar development and artificial personality implementation, comprising:
a first device including a local processor, a local memory with a local database, and a first graphical user interface (GUI);
a second device including a second local processor, a second local memory with a second local database, and a second GUI;
a server hosting a virtual assistant (VA) service on a platform, wherein the server includes at least one processor and at least one memory with at least one database;
wherein the first device and the second device are connected to the server via wireless network connection and are configured to access the VA service and transmit information to the server;
wherein the first device constructs a first user account and receives a first user profile including a first user personality;
wherein the second device constructs a second user account and receives a second user profile including a second user personality;
wherein the first user personality and the second user personality each include at least one user characteristic;
wherein the first device transmits the first user account to the server, and wherein the second device transmits the second user account to the server;
wherein the first user account and the second user account are stored on the at least one memory of the server;
wherein the VA service constructs a first user avatar from the first user profile, wherein the first user avatar embodies the first user personality, wherein the VA service constructs a second user avatar from the second user profile, wherein the second user avatar embodies the second user personality;
wherein the VA service loads the first user profile onto the first device based upon a determination that a first user associated with the first user profile is using the first device via facial recognition of the first user;
wherein the VA service is operable to determine a physical appearance of the first user avatar based on characteristics and/or personality traits selected by the first user via the first GUI;
wherein the first user account receives a first artificial profile including a first artificial personality, wherein the first user account further receives a selection of at least one artificial personality trait and/or at least one artificial characteristic;
wherein the VA service constructs a first artificial avatar for the first artificial profile, wherein the first artificial avatar embodies the first artificial personality, including the at least one artificial personality trait, and an appearance of the at least one artificial characteristic received by the first user account;
wherein the second user account receives a second artificial profile including a second artificial personality, wherein the second user account further receives a second selection of a second at least one artificial personality trait and/or a second at least one artificial characteristic;
wherein the VA service constructs a second artificial avatar for the second artificial profile, wherein the second artificial avatar embodies the second artificial personality, including the second at least one artificial personality trait, and a second appearance of the second at least one artificial characteristic received by the second user account;
wherein the VA service is operable to extract and correlate meanings, emotions, and ideas from an input, wherein the input is transmitted from the device, analyzed using a natural language processing (NLP) engine, and matched to a predetermined semantic category;
wherein the first user account and the second user account are operable to interact via the platform;
wherein the VA service displays the first user avatar, the first artificial avatar, the second user avatar, and the second artificial avatar on the platform; and
wherein the first artificial avatar is automated and interacts on the platform in a manner dictated by the first artificial personality, wherein the second artificial avatar is automated and interacts on the platform in a manner dictated by the second artificial personality;
wherein the VA service is operable to access, analyze, and suggest a podcast, television show, movie, book and/or audiobook from at least one external database that relates to at least one lesson plan; and
wherein the VA service is operable to modify the parameters of the at least one artificial personality trait and/or the second at least one artificial personality trait to follow the at least one lesson plan or a user goal.

24. The system of claim 23, wherein the VA service combines a first personality with at least one additional personality to create a merged personality, wherein the first personality is the first user personality, the first artificial personality, the second user personality or the second artificial personality, wherein the at least one additional personality is the first user personality, the first artificial personality, the second user personality or the second artificial personality, and wherein the first personality is different from the at least one additional personality.

25. The system of claim 23, wherein the first user avatar is automated by the VA service using the first user personality and is operable to interact on the platform in a manner dictated by the first user personality, wherein the second user avatar is automated by the VA service using the second user personality and is operable to interact on the platform in a manner dictated by the second user personality.

26. The system of claim 23, wherein the platform is an Augmented Reality (AR) platform, a Virtual Reality (VR) platform, or a gaming platform.

27. The system of claim 23, wherein the server receives authorization from the first device and/or the second device to enable the interaction of the first user avatar and the second user avatar on the platform.

28. The system of claim 23, wherein the first user avatar, the second user avatar, the first artificial avatar, and the second artificial avatar are selectively enabled and disabled via the first device and/or the second device.

* * * * *